United States Patent
Iga

(10) Patent No.: US 9,043,075 B2
(45) Date of Patent: May 26, 2015

(54) VEHICLE INFORMATION ACQUISITION SYSTEM AND VEHICLE INFORMATION ACQUISITION METHOD

(75) Inventor: Norihisa Iga, Minato-ku (JP)

(73) Assignees: TOYOTA JIDOSHA KABUSHIKI KAISHA, Toyota-shi (JP); NEC Corporation, Tokyo (JP)

(*) Notice: Subject to any disclaimer, the term of this patent is extended or adjusted under 35 U.S.C. 154(b) by 0 days.

(21) Appl. No.: 13/984,679

(22) PCT Filed: Feb. 9, 2012

(86) PCT No.: PCT/IB2012/000227
§ 371 (c)(1),
(2), (4) Date: Aug. 9, 2013

(87) PCT Pub. No.: WO2012/107828
PCT Pub. Date: Aug. 16, 2012

(65) Prior Publication Data
US 2013/0317692 A1    Nov. 28, 2013

(30) Foreign Application Priority Data
Feb. 10, 2011    (JP) .................. 2011-027646

(51) Int. Cl.
*G06F 17/00*    (2006.01)
*G07C 5/00*    (2006.01)
*G07C 5/08*    (2006.01)
(52) U.S. Cl.
CPC .............. *G06F 17/00* (2013.01); *G07C 5/008* (2013.01); *G07C 5/0808* (2013.01)
USPC .............................. 701/31.4; 701/1

(58) Field of Classification Search
USPC .......................... 701/31.4, 29.1, 29.6, 1, 34; 702/183–185
See application file for complete search history.

(56) References Cited

U.S. PATENT DOCUMENTS

| | | | |
|---|---|---|---|
| 6,028,537 A * | 2/2000 | Suman et al. ............... 340/988 |
| 2005/0131587 A1* | 6/2005 | Takamatsu .................. 701/1 |
| 2007/0294360 A1 | 12/2007 | Ebling et al. | |
| 2008/0222246 A1 | 9/2008 | Ebling et al. | |
| 2008/0255721 A1 | 10/2008 | Yamada | |
| 2011/0144858 A1* | 6/2011 | Yun et al. ................... 701/33 |

FOREIGN PATENT DOCUMENTS

| | | |
|---|---|---|
| CN | 101455056 A | 6/2009 |
| EP | 1 156 316 A1 | 11/2001 |

(Continued)

*Primary Examiner* — Yonel Beaulieu
(74) *Attorney, Agent, or Firm* — Oblon, McClelland, Maier & Neustadt, L.L.P.

(57) ABSTRACT

A vehicle information acquisition system includes a vehicle and an information management center. The vehicle includes an information acquisition portion that acquires a piece of vehicle information, which is processed by an information processing unit, based on a set collection condition, and transmits the acquired piece of the vehicle information to the information management center. The information management center determines a new collection condition for the piece of the vehicle information, which is processed by the information processing unit, based on a result of an analysis of the transmitted piece of the vehicle information, and transmits the determined collection condition to the vehicle as a collection condition for a piece of vehicle information to be subsequently acquired by the information acquisition portion to re-set the transmitted collection condition in the information acquisition portion.

16 Claims, 8 Drawing Sheets

(56) References Cited

FOREIGN PATENT DOCUMENTS

| JP | 2004-268633 A | 9/2004 |
| JP | 2005-146905 A | 6/2005 |
| JP | 2005-335590 A | 12/2005 |
| JP | 2006-283651 A | 10/2006 |
| JP | 2008-261777 A | 10/2008 |
| JP | 2011-005880 A | 1/2011 |
| JP | 2006-096325 A | 4/2013 |
| WO | WO 2007/144419 A2 | 12/2007 |
| WO | WO 2007/144419 A3 | 12/2007 |

* cited by examiner

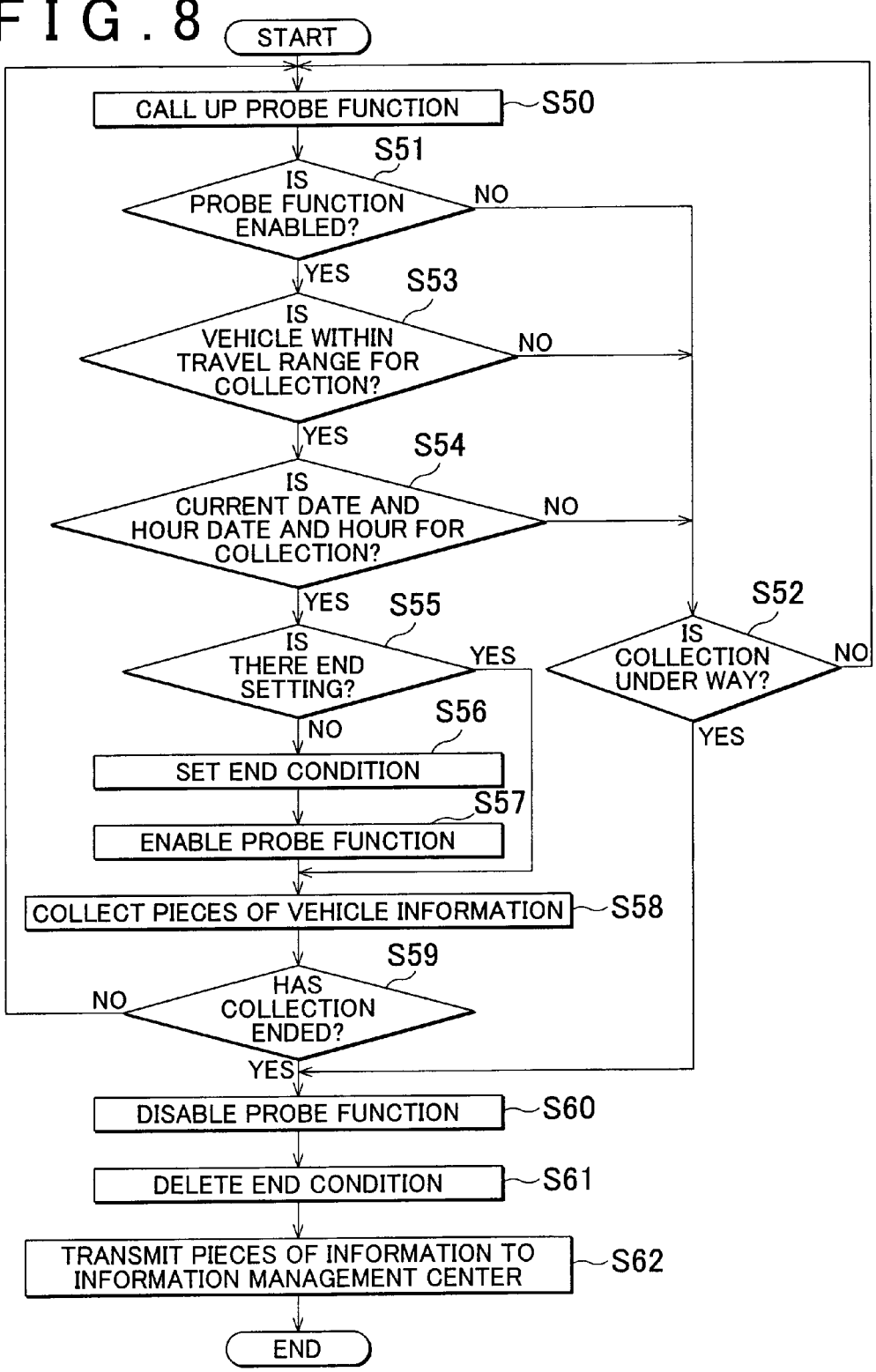

VEHICLE INFORMATION ACQUISITION SYSTEM AND VEHICLE INFORMATION ACQUISITION METHOD

BACKGROUND OF THE INVENTION

1. Field of the Invention

The invention relates to a vehicle information acquisition system and a vehicle information acquisition method that acquire pieces of vehicle information from an information processing unit mounted on a vehicle.

2. Description of Related Art

In general, a vehicle such as an automobile or the like is provided with a self-diagnosis unit that diagnoses a vehicle state including a state of an internal combustion engine and the like based on pieces of vehicle information acquired from various sensors that are mounted on the vehicle. Such a self-diagnosis unit can carry out a more detailed diagnosis and a more accurate diagnosis as the number of pieces of vehicle information to be used for the diagnosis increases. On the other hand, the increase in the number of pieces of vehicle information to be used for the diagnosis leads to an increase in the load in processing those pieces of information and the shortage of a storage area as well, so that the determination of a cause at an appropriate timing may be made difficult as a result of a fall in the processing speed of the self-diagnosis.

Thus, an example of a system that can restrain the processing speed of a diagnosis processing from falling while maintaining a certain diagnosis accuracy is described in Japanese Patent Application Publication No. 2005-146905 (JP 2005-146905 A). In the system described in JP 2005-146905 A, a piece of information on a failure in a target region of a failure diagnosis is detected as a piece of diagnostic information, and a piece of failure history information on the target region (a piece of vehicle information) is transmitted from a vehicle to a dealer. Then, after receiving the piece of the failure history information (the piece of the vehicle information) thus transmitted from the vehicle, the dealer identifies this vehicle based on a result of an analysis of the piece of the failure history information, and makes a transmission request to request this identified vehicle to transmit the piece of the diagnostic information. In this system, as described above, the piece of the diagnostic information to be used for the failure diagnosis is selected from the piece of the failure history information (the piece of the vehicle information) on the dealer side. Thus, the load in processing pieces of information by the self-diagnosis unit on the vehicle side is alleviated, and the piece of the diagnostic information to be acquired is narrowed down on the dealer side as well, so that the processing load of the diagnostic processing is restrained from increasing. Besides, since the diagnostic processing is performed based on the narrowed-down piece of the diagnostic information, the diagnostic accuracy thereof can be held high.

By the way, in recent years, a vehicle is equipped with a large number of information processing units such as various electronic control units (ECUs) and the like, and programs that are executed and processed by those information processing units are also becoming the target of a self-diagnosis. Besides, the self-diagnosis in this case is different from a method of identifying an already-prepared piece of diagnostic information by narrowing it down from a piece of failure history information (a piece of vehicle information) as in the case of the system described in JP 2005-146905 A, and often adopts a method of identifying an origin of a piece of vehicle information that assumes an abnormal value by tracing back the processing procedure of a program. However, the preliminary embedment of positions for acquiring those pieces of vehicle information for determining a cause in the program that is used to determine the cause incurs the complication of the program itself, and hence is not easy. Further, even if such a program can be created, an attempt to enhance the diagnostic accuracy thereof cannot avoid an increase in the number of pieces of vehicle information to be used for the diagnosis.

SUMMARY OF THE INVENTION

The invention provides a vehicle information acquisition system and a vehicle information acquisition method that make it possible to suitably restrain the amount of vehicle information to be acquired for a diagnosis from increasing while enhancing the accuracy in the diagnosis even in the case where an origin of a piece of vehicle information that assumes an abnormal value is determined by tracing back a processing procedure of a program.

A first aspect of the invention is a vehicle information acquisition system. This vehicle information acquisition system includes a vehicle, an information processing unit that is mounted on the vehicle and is configured to process a piece of vehicle information as a piece of information indicating a vehicle state, and an information management center that is configured to be able to communicate with the vehicle and acquire the piece of the vehicle information. The vehicle includes an information acquisition portion that is configured to acquire the piece of the vehicle information to be processed by the information processing unit based on a set collection condition, and transmit the acquired piece of the vehicle information to the information management center. The information management center is configured to determine a new collection condition for the piece of the vehicle information to be processed by the information processing unit based on a result of an analysis of the transmitted piece of the vehicle information, and transmit the determined piece of the collection condition to the vehicle as a collection condition for a piece of vehicle information to be subsequently acquired by the information acquisition portion to re-set the transmitted collection condition in the information acquisition portion.

A second aspect of the invention is a vehicle information acquisition method of causing an information management center, which is configured to be able to communicate with a vehicle, to acquire a piece of vehicle information that is processed by an information processing unit mounted on the vehicle as a piece of information indicating a vehicle state. Until a piece of information that is needed as a piece of vehicle information is obtained, this method repeats: acquiring a piece of vehicle information, which is processed by the information processing unit, based on a set collection condition through an information acquisition portion provided in the vehicle, and transmitting the acquired piece of the vehicle information to the information management center; and, in the information management center, determining a new collection condition for the piece of the vehicle information to be processed by the information processing unit, based on a result of an analysis of the transmitted piece of the vehicle information, and transmitting the determined collection condition to the vehicle as a collection condition for a piece of vehicle information to be subsequently acquired by the information acquisition portion to re-setting the transmitted collection condition in the information acquisition portion.

According to this configuration or this method, using the result of the analysis of the collected piece of the vehicle information, the piece of the vehicle information to be collected by the vehicle can be determined Thus, based on the collected pieces of vehicle information, the piece of the vehicle information to be subsequently collected can be so set that that a piece of information more suited to a purpose is acquired. For example, when an abnormality is detected from the piece of the vehicle information, it is possible to set the collection condition in such a manner as to narrow down a cause of the abnormality and the like.

Further, the collection condition is determined for an arbitrary piece of vehicle information that is processed by the information processing unit. Therefore, the piece of the vehicle information acquired from the information processing unit can be not only a vehicle state based on an on-vehicle sensor but also a piece of information processed by a program or the like, etc. Thus, the piece of the information that is handled by the program executed by the information processing unit or the like can also be set as a piece of vehicle information. Therefore, a detailed determination on a cause of a symptom of an abnormality occurring in the vehicle or the like can be made from a large number of pieces of information, and the symptom of the abnormality can be detected as well.

In addition, the piece of the vehicle information is collected on the collection condition that is so set as to narrow down the cause. Therefore, the amount of vehicle information to be collected at a time can be reduced, so that even an information processing unit in a vehicle with low information processing capacity can also collect pieces of vehicle information while maintaining its normal function. Thus, the collection of pieces of vehicle information can be facilitated as well.

In the vehicle information acquisition system according to the foregoing first aspect of the invention, the information acquisition portion may be configured to acquire a relevant piece of vehicle information based on an initially set collection condition, when no collection condition is set by the information management center.

In the vehicle information acquisition method according to the foregoing second aspect of the invention, the information acquisition portion may be caused to acquire a relevant piece of vehicle information based on an initially set collection condition, when no collection condition is set by the information management center.

According to this configuration or this method, for example, when there is no need to set the collection condition, the monitoring of pieces of vehicle information that are suited to the monitoring of a general state of the vehicle, for example, the exhaustive monitoring of a state, the monitoring of pieces of information with high level of importance, and the like can be carried out by using a predetermined collection condition. Thus, it is possible to spare the burden of setting the collection condition as well.

In the vehicle information acquisition system according to the foregoing first aspect of the invention, the initially set collection condition may be a collection condition that enables acquisition of a piece of vehicle information indicating a symptom of an abnormality.

In the vehicle information acquisition method according to the foregoing second aspect of the invention, a collection condition that enables acquisition of a piece of vehicle information indicating a symptom of an abnormality may be used as the initially set collection condition.

According to this configuration or this method, a condition on a symptom of an abnormality is used as the collection condition, so that a cause of a symptom of an abnormality occurring in the vehicle can be swiftly determined as well. In particular, when a piece of vehicle information on a symptom of an abnormality is acquired through the use of a failure diagnosis unit that is generally provided in the vehicle, the setting of the collection condition prior to the narrowing-down of the cause can be omitted as well.

In the vehicle information acquisition system according to the foregoing first aspect of the invention, the information management center may be configured to analyze an abnormality in the vehicle from the transmitted piece of the vehicle information, and determine a new collection condition to be re-set in the information acquisition portion, based on contents of the abnormality in the vehicle that is a result of the analysis.

In the vehicle information acquisition method according to the foregoing second aspect of the invention, by the information management center, an abnormality in the vehicle may be analyzed from the transmitted piece of the vehicle information and a new collection condition to be re-set in the information acquisition portion may be determined based on contents of the abnormality in the vehicle that is a result of the analysis.

According to this configuration or this method, the abnormality in the vehicle is analyzed by the information management center. Therefore, the abnormality in the vehicle can be analyzed in more detail as well in comparison with the determination made by the on-vehicle information processing unit. Further, by further acquiring pieces of vehicle information based on the collection condition that is determined based on the result of the analysis, it also becomes possible to narrow down the cause of the abnormality stepwise.

In the vehicle information acquisition system according to the foregoing first aspect of the invention, the information management center may be configured to identify a vehicle type of a vehicle that has transmitted a piece of vehicle information, and accumulate results of an analysis for each identified vehicle type individually.

In the vehicle information acquisition method according to the foregoing second aspect of the invention, by the information management center, a vehicle type of a vehicle that has transmitted a piece of vehicle information may be identified and results of an analysis may be accumulated for each identified vehicle type individually.

According to this configuration or this method, since the characteristic of each vehicle differs depending on the vehicle type thereof, the accumulation of pieces of vehicle information on the vehicles of the same type also makes it possible to detect the characteristics of the vehicles of the same type, especially an abnormality peculiar to the vehicle type.

In the vehicle information acquisition system according to the foregoing first aspect of the invention, a piece of position information and a piece of time information may be added to the piece of the vehicle information, and the information management center may be configured to determine a collection condition to be re-set in the information acquisition portion, based on a result of an analysis of the piece of the vehicle information, which is obtained by analyzing the piece of the position information and the piece of the time information together.

In the vehicle information acquisition method according to the foregoing second aspect of the invention, a piece of position information and a piece of time information may be added to the piece of the vehicle information, and, by the information management center, a collection condition to be re-set in the information acquisition portion may be determined based on a result of an analysis of the piece of the vehicle information, which is obtained by analyzing the piece of the position information and the piece of the time information together.

The traffic situation originally differs depending on the time zone as well as the position. In some cases, therefore, the piece of the vehicle information characteristically changes depending on the position or the time. Thus, according to this configuration or this method, by analyzing the position and the time together, it becomes possible to re-set the collection condition so that a more detailed analysis, for example, the determination of a situation in which an abnormality occurs can be suitably carried out.

In the vehicle information acquisition system according to the foregoing first aspect of the invention, the collection condition to be re-set may include at least one of a piece of position information and a piece of time information.

In the vehicle information acquisition method according to the foregoing second aspect of the invention, at least one of a piece of position information and a piece of time information may be included in the collection condition to be re-set.

The traffic situation originally differs depending on the time zone as well as the position. In some cases, therefore, the piece of the vehicle information characteristically changes depending on the position or the time. Thus, by determining the position and the time according to this configuration or this method, a more detailed analysis, for example, the determination of a situation in which an abnormality occured can be suitably carried out. Further, since the position and the time are determined, the amount of information in the piece of the vehicle information to be acquired can be reduced as well.

In the vehicle information acquisition system according to the foregoing first aspect of the invention, the information management center may be configured to determine the collection condition to be re-set based on a result of an analysis of pieces of vehicle information that are acquired from a plurality of the vehicles.

In the vehicle information acquisition method according to the foregoing second aspect of the invention, by the information management center, the collection condition to be re-set may be determined based on a result of an analysis of pieces of vehicle information that are acquired from a plurality of vehicles.

According to this configuration or this method, by setting the collection condition based on the pieces of the vehicle information acquired from the plurality of the vehicles, it becomes possible to determine whether or not a change in the piece of the vehicle information that occurs in a certain one of the vehicles occurs in another vehicle as well. Thus, a determination for narrowing down the cause of the change occurring in the piece of the vehicle information, for example, the cause of an abnormality or the like can be suitably made as well.

In the vehicle information acquisition system according to the foregoing first aspect of the invention, the information management center may be configured to re-set the collection condition to be re-set also in an information acquisition portion of another vehicle that is different from the vehicle that has transmitted the piece of the vehicle information.

In the vehicle information acquisition method according to the foregoing second aspect of the invention, by the information management center, the collection condition to be re-set may be re-set also in an information acquisition portion of another vehicle that is different from the vehicle that has transmitted the piece of the vehicle information.

According to this configuration or this method, the collection condition is set in the plurality of the vehicles, so that pieces of vehicle information are acquired from the plurality of the vehicles that are each equipped with the information acquisition portion. Thus, it becomes possible, for example, to determine which of the change that depends on a certain one of the vehicles, the change that depends on a certain vehicle type, and the change that occurs in all vehicles in general, a change occurring in the pieces of the vehicle information on the plurality of the vehicles is. Thus, a determination for narrowing down the cause of the change occurring in the pieces of the vehicle information, for example, the cause of an abnormality or the like can be suitably made as well.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein:

FIG. 8 is a flowchart showing a processing procedure of allowing the vehicle to collect pieces of vehicle information based on the set collection condition in the vehicle information acquisition system.

DETAILED DESCRIPTION OF EMBODIMENT

One embodiment obtained by embodying a vehicle information acquisition system according to the invention will be described with reference to FIGS. 1 to 3. First of all, a configuration of the vehicle information acquisition system according to this embodiment of the invention will be described.

Figure 1:
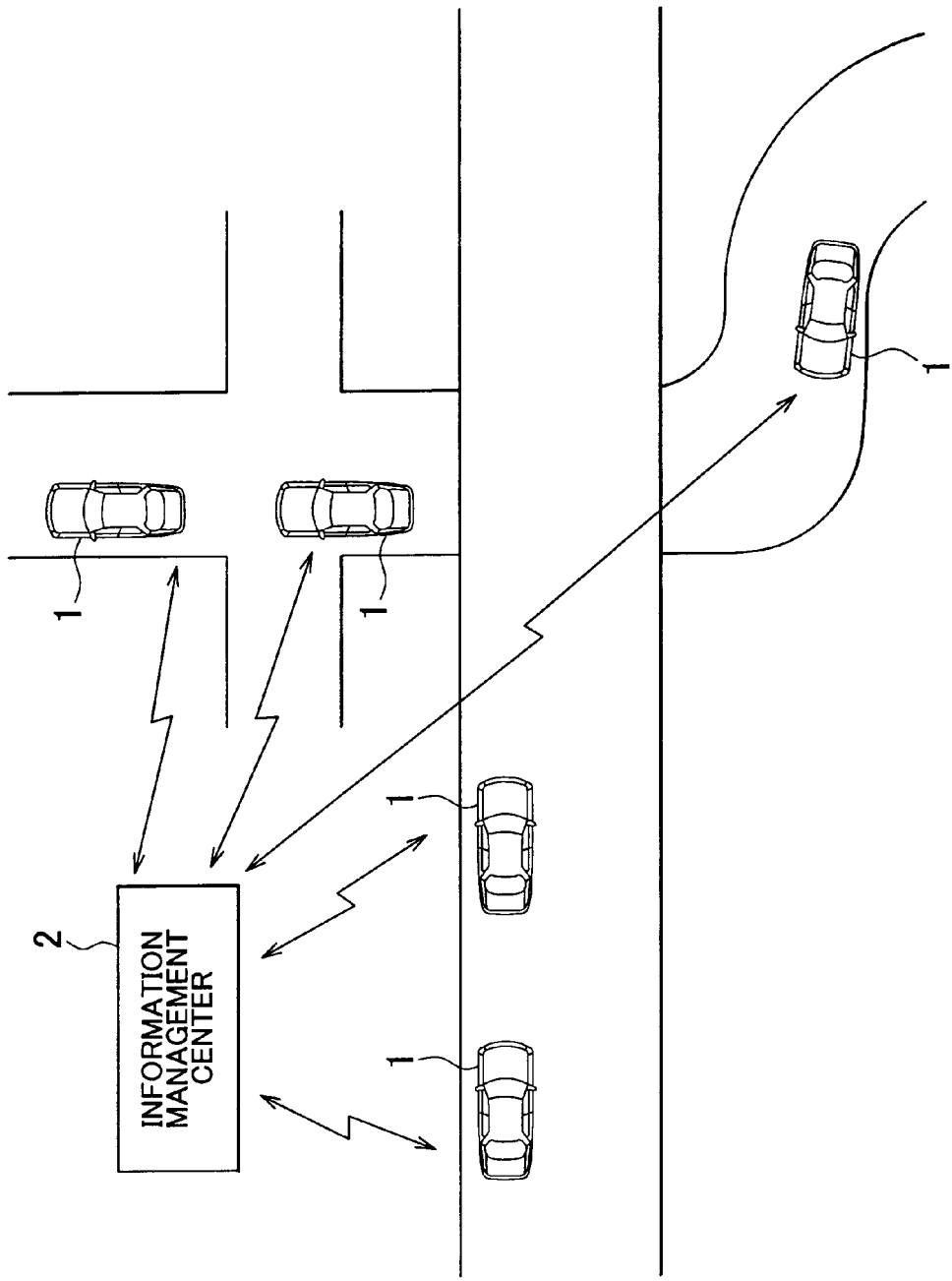
FIG. 1 is a schematic diagram showing a concrete form of a configuration of one embodiment obtained by embodying a vehicle information acquisition system according to the invention.

As shown in FIG. 1, the vehicle information acquisition system includes a plurality of vehicles 1 traveling in various traffic environments, and an information management center 2 that can mutually communicate with the vehicles 1 by radio. Each of the vehicles 1 transmits pieces of vehicle information, which are made up of pieces of information acquired from various sensors in each of the vehicles 1, pieces of information processed by a program that is executed by an information processing unit such as a car navigation system or the like mounted on each of the vehicles 1, and the like, to the information management center 2. The information management center 2 analyzes the pieces of the vehicle information transmitted from the vehicles 1, and designates pieces of vehicle information to be collected and a collection condition for collecting them, for each of the vehicles 1, in order to acquire pieces of information suited to an analysis from each of the vehicles 1.

Figure 2:
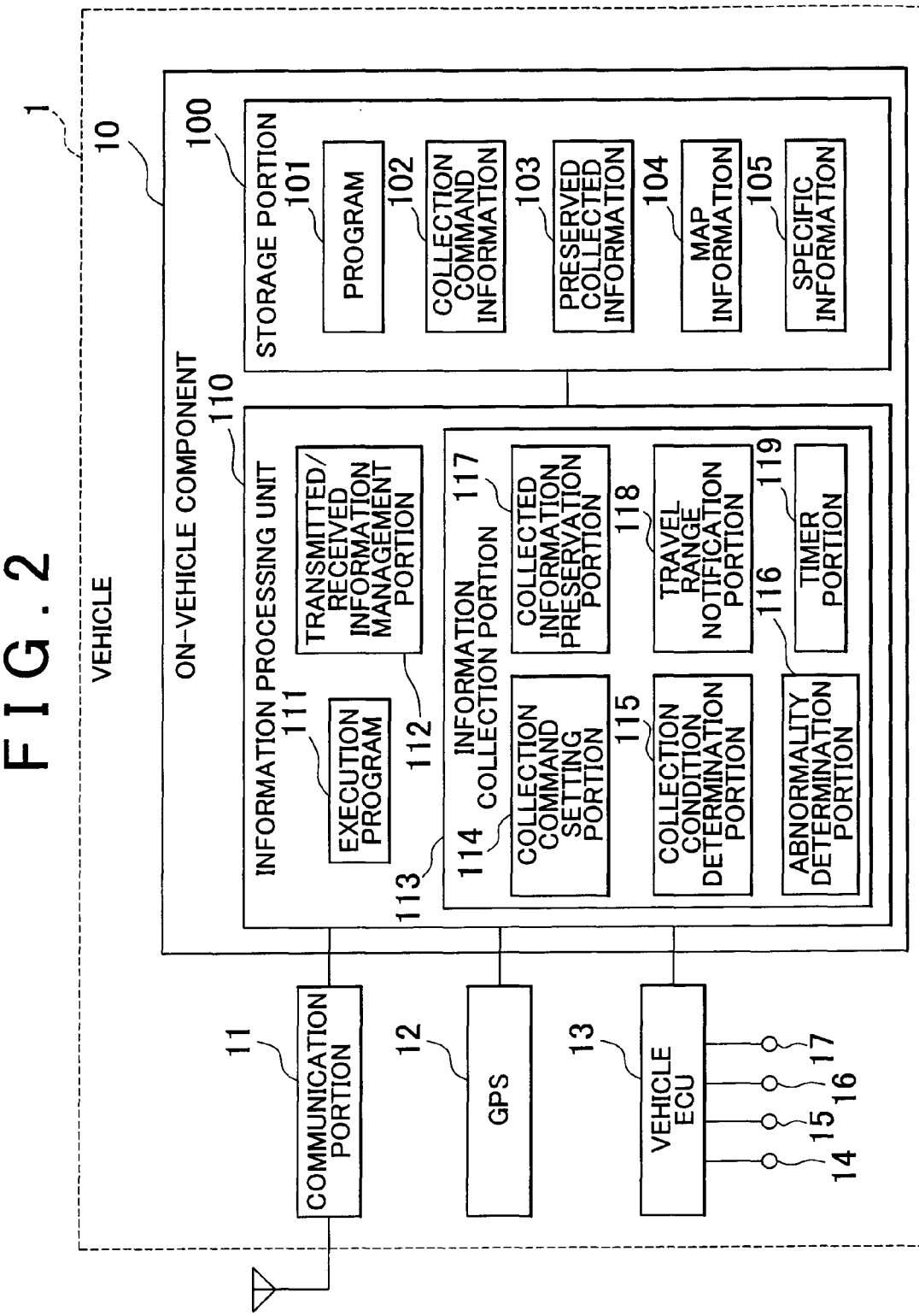
FIG. 2 is a block diagram showing a system configuration of the vehicle information acquisition system on a vehicle side.

As shown in FIG. 2, each of the vehicles 1 includes an on-vehicle component 10 as an information processing unit that is a car navigation system or the like, an on-vehicle communication portion 11 that is connected to the on-vehicle component 10 such that various pieces of information can be given/received thereto/therefrom, a GPS 12 that is connected to the on-vehicle component 10 so that pieces of position information can be transmitted to the on-vehicle component 10, and a vehicle ECU 13 that is connected to the on-vehicle component 10 such that pieces of information acquired from various sensors 14 to 17 can be transmitted to the on-vehicle component 10.

The on-vehicle communication portion 11 is designed to establish mutual data communication with the information management center 2 through radio communication. The GPS 12 is what is called a global positioning system, which receives GPS signals from a plurality of GPS satellites to accurately detect current travel positions of the vehicles 1, a current time, etc. and outputs the detected travel positions and the detected time to the on-vehicle component 10.

The vehicle ECU 13 is connected to the on-vehicle component 10 in such a manner as to enable data communication via an on-vehicle network or the like. The vehicle ECU 13 is made up of one or a plurality of ECUs that perform vehicle control etc. Various sensors such as a speed sensor 14, a steering angle sensor 15, an engine rotational speed sensor 16, an engine temperature sensor 17, and the like are connected to the ECUs respectively. Besides, pieces of information acquired from the various sensors 14 to 17 are output from the vehicle ECU 13 to the on-vehicle component 10.

The on-vehicle component 10 includes an information processing unit 110 as an on-vehicle information processing unit, a main component of which is a microcomputer, and a storage portion 100 that is utilized as a storage unit of the information processing unit 110. The on-vehicle component 10 detects a current travel position of the vehicle 1 with the aid of the GPS 12 or the like, and for example, guides the vehicle 1 along a travel route to a travel destination by referring to map information 104 stored in the storage portion 100 based on the detected current travel position of the vehicle 1, as a function of a navigation system.

The storage portion 100 is a well-known storage unit, into/from which data is written/read by the information processing unit 110. Stored in the storage portion 100 are a program 101 that is read into the information processing unit 110 to be executed and processed, collection command information 102 as a piece of command information for acquiring pieces of vehicle information that are handled by the information processing unit 110, and preserved collected information 103 as preserved pieces of vehicle information or the like that are acquired based on the collection command information 102. Further, the preset map information 104, and specific information 105 as pieces of information specific to each of the vehicles 1, such as a registration number of each of the vehicles 1, a vehicle ID specific to the vehicle, a vehicle type, a model, a model year, a place of destination, a specification, and the like, are stored in the storage portion 100.

The program 101 is a basic function program that is executed and processed by the information processing unit 110 in order for the on-vehicle component 10 to provide a user with the basic function of the navigation system. Although not shown, an optional program that endows the navigation system with optional functions, an information acquisition program that acquires pieces of vehicle information that are handled by the program that is being executed, and the like are also stored in the storage portion 100. In addition, an operation system of the information processing unit 110 and the like may also be stored in the storage portion 100. The information acquisition program (an information collection portion 113) is provided with one or a plurality of probe functions as functions for acquiring information. By being called by the executed program 101 (an execution program 111), each of the probe functions can detect an operation (a sequence) of the program that has called the function, and can acquire pieces of vehicle information that are handled by the program that has called the function. The pieces of the vehicle information to be acquired by each of the probe functions are set based on the collection command information 102. It should be noted that the pieces of the vehicle information that are acquired by each of the probe functions are stored into a memory or the storage portion 100.

In the program 101 according to this embodiment of the invention, probe points that can be used to call the probe functions are set at a plurality of locations respectively. By calling a probe function provided in the information collection program from each of the probe points, each of the probe points can cause the information collection program to detect an operation of the program, and can cause the called probe function to acquire pieces of vehicle information. The address of this probe point is clarified beforehand by structure data of the basic function program. That is, each of the probe points in the program 101 calls a corresponding one of the probe functions in the information acquisition program, so that the sequence of that probe point is detected, and pieces of vehicle information such as a value passed over from that probe point and the like are acquired by that probe function and stored into the storage portion 100. It should be noted that the probe points in the program 101 are usually not so set as to call the probe functions, and that pieces of vehicle information are therefore not collected using the probe functions.

In the collection command information 102, one or a plurality of collection commands that are made up of pieces of vehicle information, which are collected from the program 101 executed and processed by the information processing unit 110 when the information acquisition program collects pieces of information, and collection conditions as conditions for collecting the pieces of the vehicle information, are set. For example, in the collection commands of the collection command information 102, "an information collection starting point", "pieces of vehicle information to be collected", "a travel range for collection", "a date and hour for collection", "an end condition", and the like are set. "The information collection starting point" is a point in the program 101 that is the subject, from which pieces of vehicle information are collected. "The pieces of vehicle information to be collected" are pieces of information for determining pieces of vehicle information that are the subjects to be collected and that are handled by the program 101 that is the subject, from which the pieces of vehicle information are collected. Further, "the travel range for collection" is a travel area of each of the vehicles 1 that is determined as a condition for acquiring pieces of vehicle information. "The date and hour for collection" includes a starting date and hour and an ending date and hour, which are determined as conditions for acquiring pieces of vehicle information. "The end condition" is a condition for ending the acquisition of pieces of vehicle information.

For example, in this embodiment of the invention, regarding "the information collection starting point", "a first probe point of a function F" is set as a probe point for starting to collect pieces of vehicle information based on the processing procedure (the sequence) of the program 101. As pieces of vehicle information to be collected from this probe point, for example, "an address of the called probe point", "pieces of vehicle speed information", and the like are set. Further, for example, a travel range "within a radius of 1 km from a spot A" is set as "the travel range for collection". For example, "a period between 12 o'clock and 14 o'clock on Sundays" is set as "the information on the date and hour for collection". In addition, for example, "the end of the function F or the time point when 500 milliseconds have elapsed after the start of the processing of the function F" is set as "the end condition".

It should be noted that although the collection command information 102 is sent from the information management center 2 in this embodiment of the invention, "the information collection starting point", "the pieces of the vehicle information to be collected", "the travel range for collection", "the date and hour for collection", and "the end condition" are also retained in the storage portion 100 as initial settings of the collection command information 102. Thus, when the collection command information 102 is not sent from the information management center 2, "the information collection starting point", which is initially set, and the like are set in the collection command information 102. The default values are set so that the monitoring of pieces of vehicle information that are suited to the monitoring of a general state of each of the vehicles 1, that is, for example, the exhaustive monitoring of a state, the monitoring of pieces of information with high level of importance, and the like can be carried out, that is, the default values are set to pieces of vehicle information and the collection condition for acquiring the pieces of the vehicle information such that a piece of vehicle information that indicates a symptom of an abnormality in a vehicle 1 can be acquired.

The preserved collected information 103 temporarily retains one or a plurality of pieces of collected information that include the pieces of the vehicle information collected by the information acquisition program based on the collection command information 102. Therefore, pieces of collected information that include the pieces of the vehicle information acquired based on the collection command information 102 are added one after another. Further, the pieces of the collected information including the pieces of the vehicle information retained in the preserved collected information 103 are transmitted, as needed, to the information management center 2 according to a predetermined condition. The pieces of the collected information including the pieces of the vehicle information, which have been transmitted to the information management center 2, are deleted from the preserved collected information 103 based on a confirmation that the information management center 2 has received the pieces of the vehicle information. Thus, the preserved collected information 103, to which the collected information including the collected pieces of the vehicle information is added one after another, is prevented from causing a shortage of the storage capacity of the storage portion 100.

The map information 104 is a piece of map information that is used for the navigation system, and includes pieces of road information indicating a mode of arrangement of roads themselves, pieces of information on installations attached to the roads, such as traffic lights and the like, pieces of information on facilities installed around the roads, and the like.

A microcomputer of the information processing unit 110 is provided with a calculation unit, a non-volatile memory (a ROM), a volatile memory (a RAM), etc. The storage portion 100, which serves as an external memory unit, is connected to the microcomputer of the information processing unit 110. Besides, various kinds of information processing based on various programs and various data, which are stored in the storage portion 100 and the respective memories, are performed by the microcomputer.

The information processing unit 110 is provided with the execution program 111 that represents the program 101 that provides a function of the on-vehicle component 10 and is being executed, and a transmitted/received information management portion 112 constituting an information acquisition portion that controls data communication with the information management center 2. Further, the information processing unit 110 is provided with the information collection portion 113 that constitutes an information acquisition portion that is the executed information acquisition program for acquiring pieces of vehicle information from the execution program 111.

The execution program 111 represents the program 101 that has been read by the information processing unit 110 and executed because of the fulfillment of an execution condition after the operation system of the on-vehicle component 10 is executed in response to the activation of the on-vehicle component 10. Owing to the execution program 111, in the on-vehicle component 10, the user can be provided with the functions of the navigation system, such as the setting of a destination of the vehicle, the guidance of the vehicle along a travel route, etc.

The transmitted/received information management portion 112 stores into the storage portion 100 the collection command information 102 that has been received from the information management center 2 via the on-vehicle communication portion 11, and notifies the information collection portion 113 that it has received the collection command information 102. Further, the transmitted/received information management portion 112 transmits the pieces of the collected information, which include the pieces of the vehicle information accumulated in the preserved collected information 103, to the information management center 2 when it is possible to establish data communication with the information management center 2 via the on-vehicle communication portion 11. After that, the transmitted/received information management portion 112 deletes the pieces of the collected information, whose reception has been confirmed, from the preserved collected information 103, based on the reception of a confirmation of reception of the pieces of the collected information, which have been transmitted to the information management center 2, from the information management center 2.

The information collection portion 113 is so provided as to associate probe functions to be called at a probe point in the execution program 111 with the probe point, at which the probe function is called. Every time each of the probe functions is called at a corresponding one of the probe points, the information collection portion 113 acquires pieces of vehicle information from the execution program 111 via the probe function. That is, the information collection portion 113 acquires the pieces of the vehicle information such as the values and the like, which are handled in the execution program 111, based on the collection command information 102 via each of the probe functions, processes the acquired pieces of the vehicle information into pieces of collected information including other pieces of information, and then stores them into the preserved collected information 103 of the storage portion 100. The information collection portion 113 includes a collection command setting portion 114 that performs various settings for collecting pieces of vehicle information, a collection condition determination portion 115 that determines whether or not conditions such as the travel position, time, etc. for collecting pieces of vehicle information are fulfilled, and an abnormality determination portion 116 that determines whether or not the values of the collected pieces of the vehicle information are abnormal. Further, the information collection portion 113 includes a collected information preservation portion 117 that acquires pieces of vehicle information and preserves the acquired pieces of the vehicle information into the preserved collected information 103 as pieces of collected information, a travel range notification portion 118 that notifies whether or not the current travel position is within "the travel range for collection", and a timer portion 119 that notifies whether or not the current time is within "a time for collection".

The collection command setting portion 114 performs the setting of calling a probe function corresponding to a probe point in the execution program 111, and the like, in accordance with the collection command information 102 read from the storage portion 100. The collection command setting portion 114 analyzes the contents of the collection command information 102, obtains one or a plurality of "information collection starting points" from the collection command information 102, and obtains "the pieces of the vehicle information to be collected", "the travel range for collection", "the date and hour for collection", and "the end condition" as conditions corresponding to the "information collection starting points" respectively. Then, the collection command setting portion 114 sets the one or the plurality of "the information collection starting points" thus obtained, and conditions corresponding thereto, respectively.

That is, the collection command setting portion 114 performs the setting of calling probe functions corresponding to probe points in the execution program 111 corresponding to "the information collection starting points" respectively, based on "the information collection starting points".

Further, the collection command setting portion 114 sets pieces of vehicle information that are acquired from the execution program 111 when a probe function is called, in the probe function called at the probe point, based on "the pieces of the vehicle information to be collected". For example, the probe function called at the first probe point of the function F is so set as to acquire, at the probe point, arguments to be sent to the function F as a piece of vehicle information, and to acquire speed information at that moment. In this manner, when each of the probe functions is called, the pieces of the vehicle information to be acquired in response to the call are set in each of the probe functions. It should be noted that the collection command setting portion 114 specifies probe points in the execution program 111 that are so set as to call probe functions based on the collection command information 102 by specifying addresses in the execution program 111.

In addition, the collection command setting portion 114 sets a travel range, in which the collection of pieces of vehicle information is enabled, in the travel range notification portion 118, based on "the travel range for collection". Thus, the travel range notification portion 118 can determine whether or not the current position of each of the vehicles 1 is within "the travel range for collection".

Further, the collection command setting portion 114 sets, in the timer portion 119, a date and hour for acquiring pieces of vehicle information, based on "the date and hour for collection". Thus, the timer portion 119 can determine whether or not the current date and hour is "the date and hour for collection".

In addition, the collection command setting portion 114 sets the contents of "the end condition" in the collection condition determination portion 115. Thus, the collection condition determination portion 115 can determine whether or not "the end condition" has been fulfilled.

Further, the collection command setting portion 114 can set whether or not the probe function called at the probe point in the execution program 111 acquires pieces of vehicle information, namely, can set the enabled/disabled state of each of the probe functions. In this embodiment of the invention, initially, the collection command setting portion 114 enables only the readout of the probe function that is called from the function F first, and sets all the probe functions to be called at the other points of the function F disabled. Then, the collection command setting portion 114 enables the other probe functions called from the function F afterward until the end condition is fulfilled, based on the result of readout of the probe function that is called from the function F first.

When a probe function of the information collection portion 113 is called from the execution program 111, the collection condition determination portion 115 determines whether or not a condition for acquiring pieces of vehicle information that are set in the called probe function is fulfilled. That is, the collection condition determination portion 115 determines whether or not the condition for acquiring the pieces of the vehicle information is fulfilled, based on a result of a determination made by the travel range notification portion 118 as to whether or not the current position of the vehicle 1 is within "the travel range for collection", and a result of a determination made by the timer portion 119 as to whether or not the current time is within "the date and hour for collection". Then, when both the conditions are fulfilled, the collection condition determination portion 115 determines that the condition for acquiring the pieces of the vehicle information is fulfilled. On the other hand, when one of the conditions is not fulfilled, the collection condition determination portion 115 determines that the condition for acquiring the pieces of the vehicle information is not fulfilled. When it is determined that the condition for acquiring the pieces of the vehicle information is fulfilled, the collection condition determination portion 115 passes the processing of the probe function to the collected information preservation portion 117 to cause it to acquire the pieces of the vehicle information. However, when it is determined that the condition for acquiring the pieces of the vehicle information is not fulfilled, the collection condition determination portion 115 returns the call of the probe function to the probe point to inhibit the acquisition of the pieces of the vehicle information.

Further, "an end condition" that inhibits the called probe function from collecting information, namely, disables the probe functions is set in the collection condition determination portion 115. For example, a case where the processing of the function F by the execution program 111 ends or a case where 500 milliseconds have elapsed after the first call of the probe function from the function F is set as "the end condition". All the probe functions are disabled when this condition is fulfilled. It should be noted that when "the end condition" is fulfilled, all the probe functions are disabled as described above, and pieces of registered information such as "the travel range for collection", "the date and hour for collection", etc. that are registered in the travel range notification portion 118 and the timer portion 119, are deleted.

The abnormality determination portion 116 makes a determination on a symptom that occurs as a step previous to an inconvenience felt by a user. The inconvenience felt by the user occurs when some symptoms are accumulated, the extent of the symptoms grows, and the handling or recovery in an apparatus becomes impossible. In order to find such a symptom early no matter how slight it is, the abnormality determination portion 116 detects an abnormal operation of the system, abnormal data values, etc. as a symptom of the inconvenience. It should be noted that the abnormality determination portion 116 makes a determination on pieces of information that may serve as pieces of symptom information, mainly by applying a predetermined abnormality determination criterion to the pieces of the vehicle information that are collected based on the collection command information 102 resulting from a default setting. It should be noted that when a piece of symptom information is detected, the abnormality determination portion 116 transfers this piece of the symptom information to the information management center 2 in the same format as the pieces of the collected information including the pieces of the vehicle information.

The collected information preservation portion 117 acquires pieces of vehicle information to be collected, which are set in a probe function to which the processing has been passed from the collection condition determination portion 115, from this probe function. Further, the collected information preservation portion 117 transmits the acquired pieces of the vehicle information to the abnormality determination portion 116 as well. Thus, the abnormality determination portion 116 can detect a piece of symptom information, based on the pieces of the vehicle information acquired from the probe function. In addition, the collected information preservation portion 117 generates pieces of collection information including the pieces of the vehicle information. The collected information preservation portion 117 constitutes the pieces of the collected information, which are obtained by adding the address of a probe point at which a probe function is called, the travel position of a vehicle 1 and the date and hour at the time when the probe function is called, the vehicle type of the vehicle 1, etc. to the pieces of the vehicle information that are, for example, passed from the probe point to the probe function as arguments, and temporarily stores the pieces of the collected information thus constituted into a memory or the like. Besides, the collected information preservation portion 117 appropriately stores the pieces of the collected information, which are temporarily stored in the memory or the like, into the preserved collected information 103 of the storage portion 100. Thus, the on-vehicle component 10 can transfer the pieces of the collected information including the pieces of the vehicle information from the preserved collected information 103 to the information management center 2.

In the travel range notification portion 118, a travel range for collecting information is set by the collection command setting portion 114. Besides, the travel range notification portion 118 detects that the travel position of a vehicle 1 has entered the travel range thus set, or that the travel position of a vehicle 1 has exited the travel range thus set. Upon detection of an entrance into the travel range or an exit from the travel range, the travel range notification portion 118 notifies the collection condition determination portion 115 of the entrance into this travel range or the exit from this travel range.

In the timer portion 119, "the date and hour for collecting" information, namely, "a start date and hour" and "an end date and hour" are set by the collection command setting portion 114. Besides, upon detecting that the date and hour has become "the start date and hour" or "the end date and hour", the timer portion 119 notifies the collection condition determination portion 115 that the date and hour has become "the start date and hour" or "the end date and hour".

Figure 3:
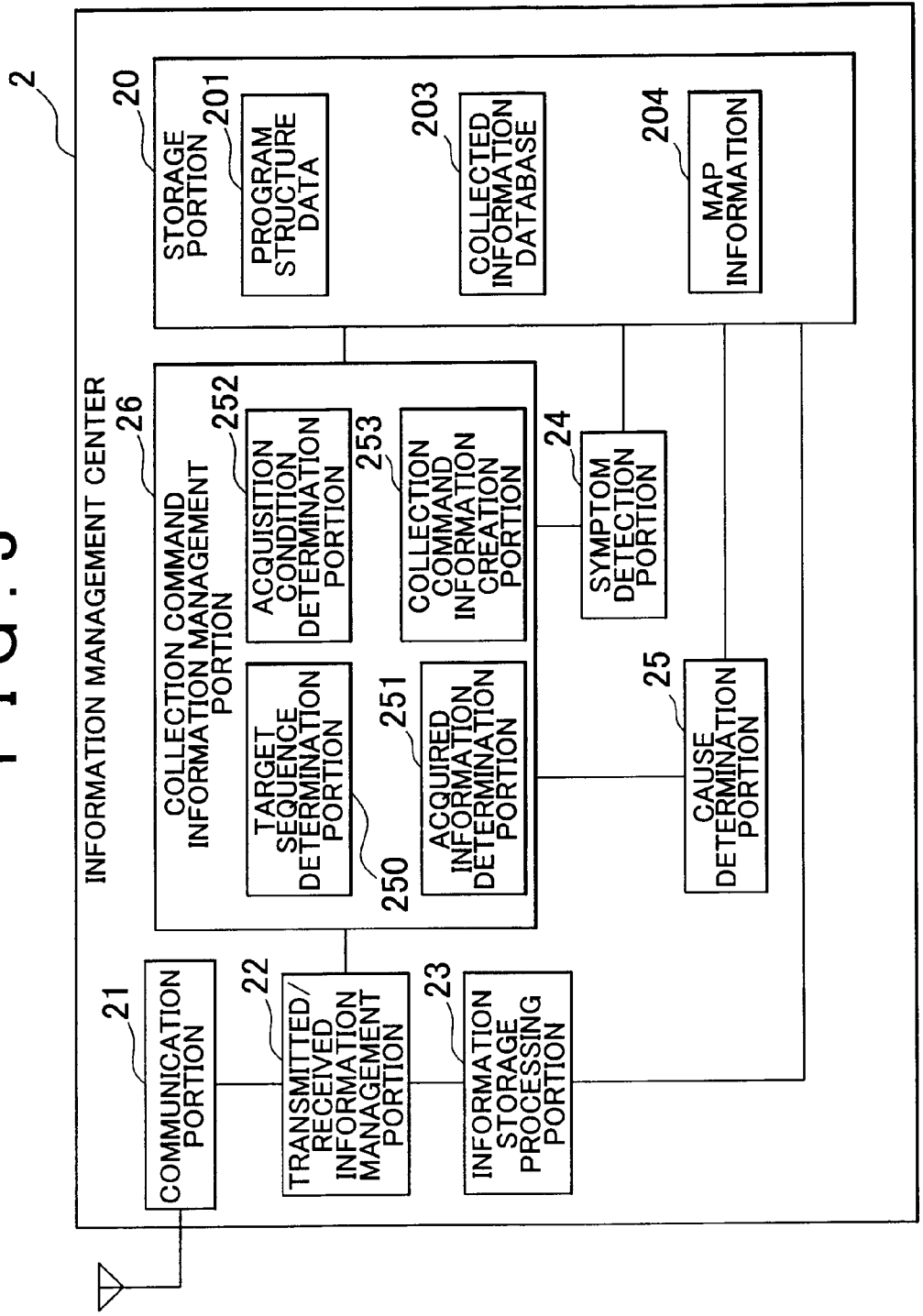
FIG. 3 is a block diagram showing a system configuration of the vehicle information acquisition system on an information management center side.
Figure 4:
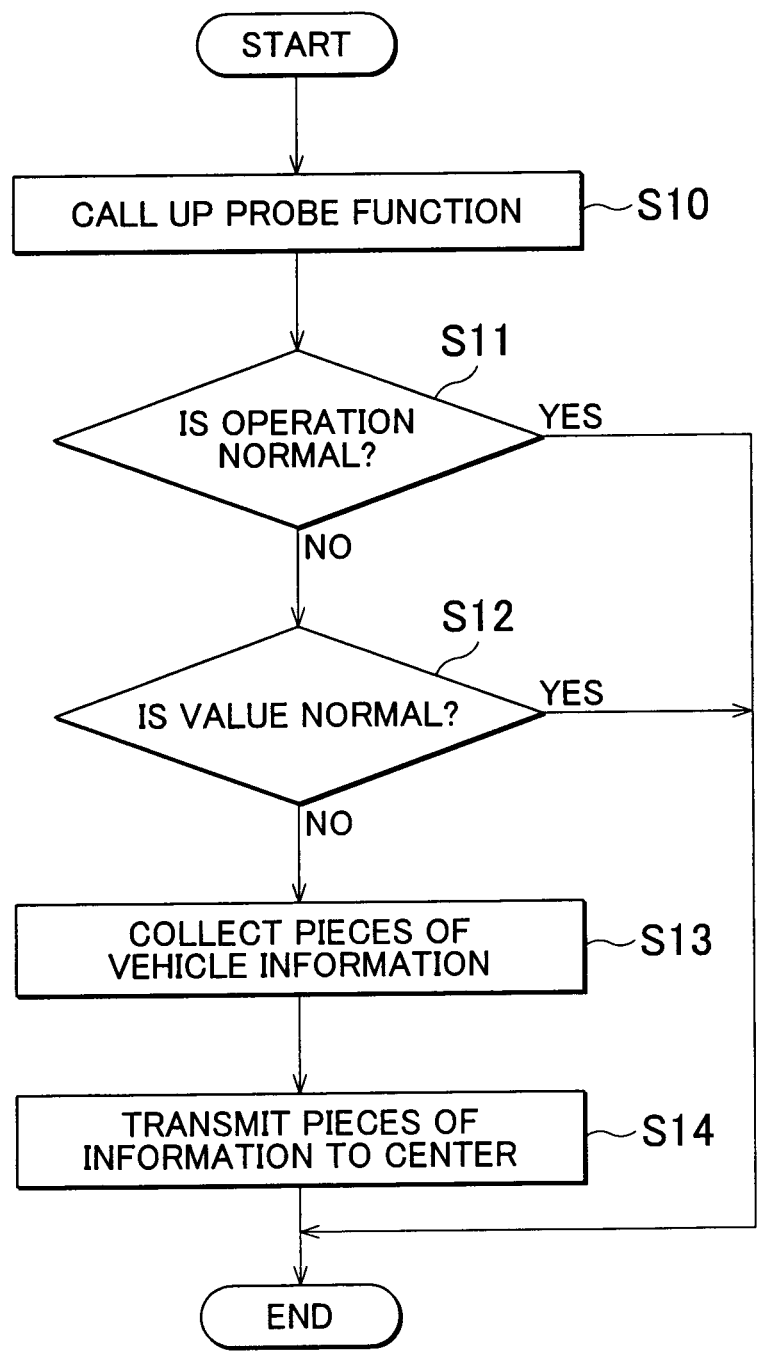
FIG. 4 is a flowchart showing a processing procedure of allowing the vehicle to acquire a piece of vehicle information based on a default setting in the vehicle information acquisition system.
Figure 5:
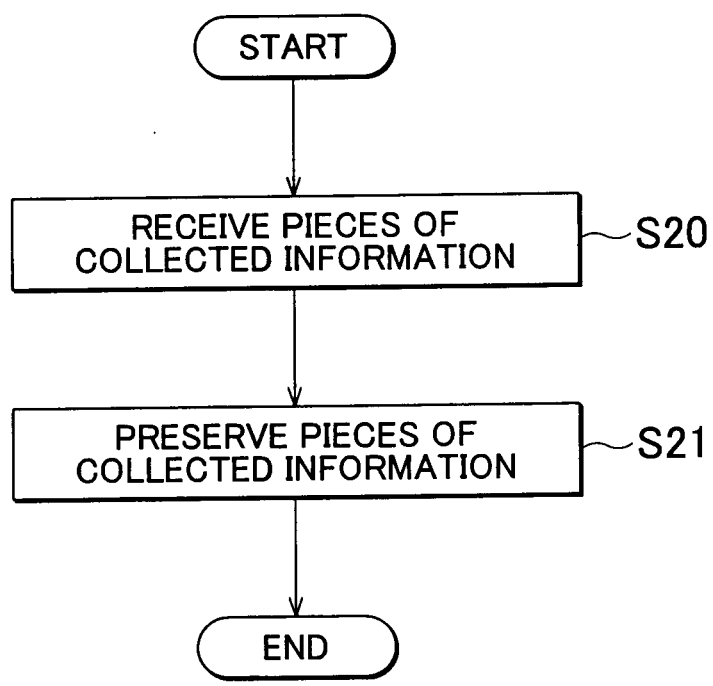
FIG. 5 is a flowchart showing a processing procedure of retaining a piece of vehicle information received by the information management center in the vehicle information acquisition system.

As shown in FIG. 3, the information management center 2 receives pieces of information on a symptom that are transmitted from all the vehicle types, and preserves those pieces of the received information on the symptom, which are classified by vehicle type. Further, based on the pieces of the information on the symptom, which are preserved classified by vehicle type, the information management center 2 narrows down pieces of information to be collected by the on-vehicle component 10 so as to acquire pieces of detailed information on the symptom, and commands the on-vehicle component 10 to collect the narrowed-down pieces of the information.

The information management center 2 includes a storage portion 20 that stores various pieces of information, a center communication portion 21 that can communicate with the vehicles 1 by radio, a transmitted/received information management portion 22 that manages radio communication between the information management center 2 and the vehicles 1, and an information storage processing portion 23 that causes the storage portion 20 to store the pieces of the collected information that are received from the vehicles 1. Further, the information management center 2 includes a symptom detection portion 24 that detects pieces of abnormal symptom information from the pieces of the vehicle information included in the pieces of the collected information or the like, and a cause determination portion 25 that determines a cause of an abnormality from the pieces of the vehicle information included in the pieces of the collected information or the like. In addition, the information management center 2 includes a collection command information management portion 26 that creates the collection command information 102, which is the information for commanding each of the vehicles 1 to acquire pieces of vehicle information to be acquired thereby, based on results of the symptom detection portion 24 and the cause determination portion 25.

Each of the transmitted/received information management portion 22, the information storage processing portion 23, the symptom detection portion 24, the cause determination portion 25, and the collection command information management portion 26 is provided with a calculation unit (not shown), a main component of which is a microcomputer. That is, the microcomputer includes a calculation unit, a storage unit, a non-volatile memory (a ROM), a volatile memory (a RAM), etc. Various kinds of information processing based on various data and programs, which are stored in the storage unit and the respective memories, are performed by the microcomputer. It should be noted that some of these portions, namely, the transmitted/received information management portion 22, the information storage processing portion 23, the symptom detection portion 24, the cause determination portion 25, and the collection command information management portion 26 may share a single microcomputer.

The center communication portion 21 is designed to establish mutual data communication with the vehicles 1 through radio communication, and can receive pieces of collected information from the respective vehicles 1 and transmit the collection command information 102 to the vehicles 1.

The storage portion 20 is a well-known storage unit into/from which data can be written/read from/into the information storage processing portion 23, the collection command information management portion 26, etc. The storage portion 20 is provided with a program structure data 201 that indicate the structure of the program 101 installed in the on-vehicle component 10, a collected information database 203 in which the pieces of the collected information collected from the on-vehicle component 10 are stored, and preset map information 204.

The program structure data 201 are data indicating the program structure of the program 101 that is executed by the on-vehicle component 10 of each of the vehicles 1. These data are made up of the program 101 itself, and a result of a structural analysis of the program 101. This result of the structural analysis includes pieces of information on pieces of vehicle information such as addresses of functions and respective commands of the program 101, variables and the like that are handled at the respective addresses, and the like. Furthermore, in this embodiment of the invention, the result of the structural analysis also includes the addresses of the probe points, the pieces of the vehicle information handled at the probe points, and the like. Thus, the collection command information management portion 26 refers to the program structure data 201, thereby determining a point that serves as the starting point of the sequence of the program 101. For example, in the case where the sequence in the program 101 is a sequence that calls a function, it is possible to find out a function called at a point where a piece of symptom information is detected, and determine an origin of the call of the function as the starting point of the sequence.

According to the program structure thus subjected to the structural analysis, it is possible to know a position where the pieces of the information processed by the program can be acquired, in addition to the probe points. For example, a jump command in the program can also be modified, temporarily cast to the probe function, and then moved to an intended jump destination. Further, a function call command can also be modified to caused a call to be performed through a probe function when a function is called.

The collected information database 203 is constituted by, for example, a database having a general structure, and classifies and stores pieces of collected information received from the vehicles 1 in such a mode that they can be searched according to each vehicle type. To be more specific, in the collected information database 203, the pieces of the collected information including the pieces of the vehicle information to be stored are stored such that the respective items, namely, the values of the pieces of the vehicle information, the probe point address at which these pieces of the vehicle information are acquired, and the travel positions of the vehicles 1 and the date and hour at the time when the probe point address is called, and the like are associated with one another. Thus, the collected information database 203 is properly arranged in such a mode as to enable the search by item name.

The map information 204 is a piece of map information for a navigation system that is employed in the on-vehicle component 10 of each of the vehicles 1. This map information 204 includes pieces of road information indicating a mode of arrangement of roads themselves, pieces of information on installations attached to the roads, such as traffic lights and the like, pieces of information on facilities installed around the roads, and the like.

The transmitted/received information management portion 22 transmits the collection command information 102 to the vehicles 1 via the center communication portion 21. It should be noted that since the vehicle types, vehicles, etc. to which the collection command information 102 is to be applied are prescribed, the transmitted/received information management portion 22 can transmit the collection command information 102 to those types of vehicles or the vehicles, to which this information is to be applied. It should be noted that the collection command information 102 may be applied to one vehicle type, a plurality of vehicle types, or all vehicle types. Further, the collection command information 102 may be applied to one vehicle, a plurality of vehicles, or all vehicles.

In addition, when it is possible to communicate with the on-vehicle communication portion 11 of each of the vehicles 1 via the center communication portion 21, the transmitted/received information management portion 22 receives pieces of collected information sent from each of the vehicles 1, and transmits the pieces of the collected information received from each of the vehicles 1 to the information storage processing portion 23. Further, the transmitted/received information management portion 22 can also receive pieces of collected information from a plurality of vehicles, and transmit them to the information storage processing portion 23. In the following, however, the processing of the pieces of the collected information received from the single vehicle 1 will be described. For the convenience of explanation, the description of pieces of collected information from other vehicles, which are processed in a similar manner, will be omitted.

The information storage processing portion 23 classifies the pieces of the collected information on the vehicles 1, which are transmitted from the transmitted/received information management portion 22, according to a predetermined rule, that is, for example, by vehicle type, and adds these pieces of the collected information to the collected information database 203 of the storage portion 20. At this moment, the information storage processing portion 23 stores the pieces of the collected information into the collected information database 203 in such a mode that the respective items such as the values of the pieces of the vehicle information, the probe point address at which the pieces of the vehicle information are acquired, the travel position of the vehicle 1 and the date and hour at the time when the probe point address is called, and the like are associated with one another, thereby making it possible to conduct a search by item name. Further, after storing the pieces of the collected information into the collected information database 203, the information storage processing portion 23 notifies the vehicle 1, via the on-vehicle communication portion 11, that it has received the stored pieces of the collected information.

The symptom detection portion 24 detects a notable symptom from pieces of symptom information collected from the respective vehicles 1. Referring to the collected information database 203, the symptom detection portion 24 detects, for example, an address in the program where the number of times of the detection of a piece of abnormal symptom information is large, as a notable piece of abnormal symptom information. Especially in this embodiment of the invention, a notable piece of symptom information is detected with the vehicle type identified.

Further, when it is unclear whether or not a piece of vehicle information included in the pieces of the collected information registered in the collected information database 203 is abnormal, the symptom detection portion 24 determines whether or not this piece of the vehicle information is abnormal, referring to the program structure data 201. For example, the symptom detection portion 24 determines whether or not the value of the piece of the vehicle information is abnormal, based on whether or not this value is within a permissible range set in the program structure data 201. Then, in order to determine a cause of this abnormality, the symptom detection portion 24 causes the collection command information management portion 26 to create the collection command information 102 for collecting pieces of vehicle information useful for determining a cause, by changing the pieces of the vehicle information to be collected and the condition for collecting them.

The cause determination portion 25 attempts to determine the cause by referring to the pieces of the collected information registered in the collected information database 203, thus analyzing pieces of vehicle information obtained from a plurality of vehicles of the same type through a data processing technology such as data mining or the like, and inspecting a causal relation among data and the like. If the cause cannot be clearly determined, the cause determination portion 25 causes the collection command information management portion 26 to create the collection command information 102 for further collecting pieces of vehicle information useful for determining a cause, by changing the pieces of the vehicle information to be collected and the condition for collecting them. The pieces of the vehicle information to be collected and the condition for collecting them are changed in condition, for example, by increasing the number of types of the pieces of the vehicle information to be collected, enlarging the travel range for collecting data, broadening the time zone, increasing the number of vehicle types, or increasing the number of pieces of vehicle information that are to be collected but do not constitute a direct cause, such as the weather, the air temperature, the travel time, the driving operation (e.g., sudden braking or the like), and the like.

The collection command information management portion 26 includes a target sequence determination portion 250 that determines a processing procedure (a sequence) of the program 101, an acquired information determination portion 251 that determines pieces of vehicle information to be acquired, and an acquisition condition determination portion 252 that determines a condition for acquiring pieces of vehicle information. Further, the collection command information management portion 26 is provided with a collection command information creation portion 253 that creates the collection command information 102 based on the determined sequence, the determined pieces of the vehicle information, and the determined condition for acquiring the pieces of the vehicle information.

The target sequence determination portion 250 analyzes the sequence of the program 101 as a target for the acquisition of pieces of vehicle information, by, for example, referring to the program structure data 201. That is, the target sequence determination portion 250 determines an address of the detected piece of the symptom information on the program, sorts out a sequence that may lead to the address, and a point serving as a starting point of the sequence in the program. In this embodiment of the invention, an address in the program is mainly determined as a probe point address of the program 101. For example, in the case of a sequence started by calling a function, a function where a symptom is detected is found out from a probe point in the program 101 at which the piece of the symptom information is detected, based on the program structure data 201. An origin of the call of the function in the program 101 is set as a starting point of the sequence, namely, "an information collection starting point".

Further, the target sequence determination portion 250 also sets "an end condition" corresponding to "an information collection starting point". Examples of "the end condition" include a case where a probe point in the program 101 where a piece of abnormal symptom information is detected has been reached, a case where the sequence that reaches a probe point in the program 101 where a piece of abnormal symptom information is detected has been exited, an elapsed time after the processing of "the information collection starting point", and the like.

The acquired information determination portion 251 determines pieces of vehicle information to be collected from pieces of vehicle information that are handled by the program from a probe point in the program that serves as "the information collection starting point" determined by the target sequence determination portion 250 to a probe point at which the piece of the symptom information is acquired. For example, referring to the program structure data 201, the acquired information determination portion 251 selects the pieces of the vehicle information to be acquired from the vehicle 1, from various pieces of information handled by the program 101, arguments of the functions, pieces of information from various available sensors, and the like.

The acquisition condition determination portion 252 determines "a travel range for collecting" pieces of vehicle information and "a date and hour for collecting" pieces of vehicle information, based on a travel position of the vehicle 1 where the piece of the symptom information is detected and a time when the piece of the symptom information is detected. For example, the acquisition condition determination portion 252 determines the travel range and the time zone from a travel position where the frequency of detection of the piece of the symptom information is high and a time when the frequency of detection of the piece of the symptom information is high, respectively. For example, referring to the collected information database 203 of the storage portion 20, the acquisition condition determination portion 252 acquires one or a plurality of pieces of information on a travel position and a time that correspond to the detection of a notable piece of symptom information, as to a probe point (an address) at which the notable piece of the symptom information is detected, and determines a location and a time with a high frequency of occurrence from the acquired piece or pieces of the information on the travel location and the time. That is, when the detection frequency of a piece of symptom information is high at a travel position, "the spot A", the acquisition condition determination portion 252 sets the travel range for collecting pieces of vehicle information to a range from a spot where the vehicle may be on the verge of traveling past "the spot A" to a spot where the vehicle is located immediately after passing "the spot A". Alternatively, the acquisition condition determination portion 252 sets the travel range within a radius of 1 km from "the spot A". Further, when the frequency with which a piece of symptom information arises "at about 13 o'clock on Sundays" is high, the acquisition condition determination portion 252 sets the date and hour for collecting pieces of vehicle information between 12 o'clock and 14 o'clock on Sundays. That is, the acquisition condition determination portion 252 sets "the start date and hour" and "the end date and hour" to "12 o'clock on Sundays" and "14 o'clock on Sundays", respectively.

The collection command information creation portion 253 generates the collection command information 102 to be transmitted to the vehicles 1, based on "the information collection starting point" and "the end condition", which are determined by the target sequence determination portion 250, "the pieces of the vehicle information" to be acquired, which are determined by the acquired information determination portion 251, and "the travel range for collection" and "the date and hour for collection", which are determined by the acquisition condition determination portion 252. In this operation, the collection command information creation portion 253 sets the respective pieces of the information, namely, "the information collection starting point", "the pieces of the vehicle information to be collected", "the travel range for collection", "the date and hour for collection", and "the end condition", based on, for example, a template or a format of the collection command information 102.

Owing to this configuration, the information management center 2 transmits the collection command information 102, which is generated by the collection command information management portion 26, to the vehicles 1 via the transmitted/received information management portion 22 and the center communication portion 21, thereby allowing the generated, collection command information 102 to be set in the information collection portion 113 of the information processing unit 110 of each of the vehicles 1.

Next, the operation of the vehicle information acquisition system according to this embodiment of the invention will be described with reference to FIGS. 4 to 8. First of all, the procedure of detecting a symptom will be described with reference to FIG. 4. It is assumed that in each of the vehicles 1, the execution program 111 and the information collection portion 113 are executed by the information processing unit 110 of the on-vehicle component 10. It should be noted that some of the probe points in the execution program 111 are so set as to call the probe functions so that the information collection portion 113 can acquire pieces of vehicle information from those probe points. It should be noted that the information collection portion 113 sets the call of the probe functions for the probe points and the pieces of the vehicle information to be acquired by the probe functions, based on the collection command information 102, which is made up of default values.

Thus, as the execution program 111 is executed, a probe function of the information collection portion 113 is called at that probe point where the call of the probe function is set (step S10). In this case, pieces of vehicle information that are passed to a probe function from the execution program 111 in the form of arguments, and the like can be acquired by the called probe function. An address of a probe point, pieces of vehicle information such as vehicle speed information and the like, which are handled by the execution program 111 at the probe point, and the like are passed to a probe function in the form of arguments. It should be noted that in this embodiment of the invention, since "the travel range for collection", "the date and hour for collection", and the like are not determined in the collection command information 102 based on the default setting, the collection condition determination portion 115 passes the processing of all the probe functions to the collected information preservation portion 117. The collected information preservation portion 117 acquires pieces of vehicle information and the like from the probe functions based on the setting, and transmits the acquired pieces of the vehicle information to the abnormality determination portion 116.

When the pieces of the vehicle information acquired from the collected information preservation portion 117 are transmitted, the abnormality determination portion 116 determines, from the transmitted pieces of the vehicle information, whether or not the execution program 111 is in normal operation (step S11). The determination on whether or not the execution program 111 is in normal operation is made by contrasting a pre-defined normal sequence of the execution program 111 and a sequence detected from the collected pieces of the vehicle information with each other. For example, in the case where a normal sequence is defined such that the call of the probe function is performed at a probe point P2 after the preceding call of the probe function at a probe point P1, when the call of the probe function detected from the acquired pieces of the vehicle information is such that the call at the probe point P2 is subsequent to the call at the probe point P1, it is determined that the operation of the execution program 111 is normal. On the other hand, when the call of the probe function detected from the acquired pieces of the vehicle information is such that the call at a probe point P3 is subsequent to the call at the probe point P1, it is determined that the operation of the execution program 111 is not normal. When it is determined that the execution program 111 is in normal operation (YES in step S11), the abnormality determination portion 116 ends the detection of a symptom based on the pieces of the vehicle information.

On the other hand, when it is determined that the execution program 111 is not in normal operation (NO in step S11), the abnormality determination portion 116 determines whether or not the value of the acquired pieces of the vehicle information is a normal value (step S12). The determination on whether or not the value of the acquired pieces of the vehicle information is a normal value is made by contrasting a value defined as a normal value in the execution program 111 and a value included in the collected pieces of the vehicle information with each other. For example, in the case where one of the values "from 1 to 20" is defined as a normal value, when the value included in the pieces of the vehicle information is one of the values "from 10 to 20", it is determined that the value in the pieces of the vehicle information is normal. On the other hand, when the value included in the pieces of the vehicle information is none of "10 to 20", that is, 5, for example, it is determined that the value in the pieces of the vehicle information is not normal. When it is determined that the value in the transmitted pieces of the vehicle information is normal (YES in step S12), the abnormality determination portion 116 ends the detection of a symptom based on these pieces of the vehicle information.

On the other hand, when it is determined that the value of the transmitted pieces of the vehicle information is not a normal value (NO in step S12), the abnormality determination portion 116 collects these acquired pieces of the vehicle information (step S13). That is, the abnormality determination portion 116 passes the processing of the probe function to the collected information preservation portion 117. The collected information preservation portion 117 generates pieces of collected information, which are made up of the acquired pieces of the vehicle information, the address of a probe point, at which a probe function is called, a travel position of each of the vehicles 1 and a date and hour at the time when the probe function is called, the vehicle types of the vehicles 1, and the like, and temporarily stores the generated pieces of the collected information into the memory or the like. When the pieces of the collected information are temporarily stored into the memory or the like, the transmitted/received information management portion 112 transmits the pieces of the collected information, which are temporarily stored in the memory, to the information management center 2 (step S14). Then, the detection of a symptom based on the pieces of the vehicle information is ended.

It should be noted that when the pieces of the collected information cannot be immediately transmitted to the information management center 2, the pieces of the collected information are stored into the preserved collected information 103 of the storage portion 100. After that, the transmitted/received information management portion 112 transmits the pieces of the collected information stored in the preserved collected information 103 to the information management center 2 when it is possible to communicate with the information management center 2.

The aforementioned detection of a symptom is repeatedly carried out at predetermined intervals or the like until the processing of executing the execution program 111 ends. Next, the procedure of preserving the pieces of the collected information received from the vehicles into the information management center will be described with reference to FIG. 5.

Upon receiving the pieces of the collected information transmitted from the vehicles 1, the information management center 2 transmits the received pieces of the collected information to the information storage processing portion 23 (step S20). The information storage processing portion 23 preserves the transmitted pieces of the collected information into the collected information database 203 of the storage portion 20 according to the classification by vehicle type. It should be noted that the pieces of the collected information are organized such that a search can be conducted by the probe point address at which the pieces of the vehicle information are acquired, the value in the pieces of the vehicle information, the travel position of each of the vehicles 1 and the date and hour at the time when the probe point address is called, and the like, and is preserved into the collected information database 203 (step S21). Then, the preservation of the pieces of the collected information received from the vehicles into the information management center ends.

Figure 6:
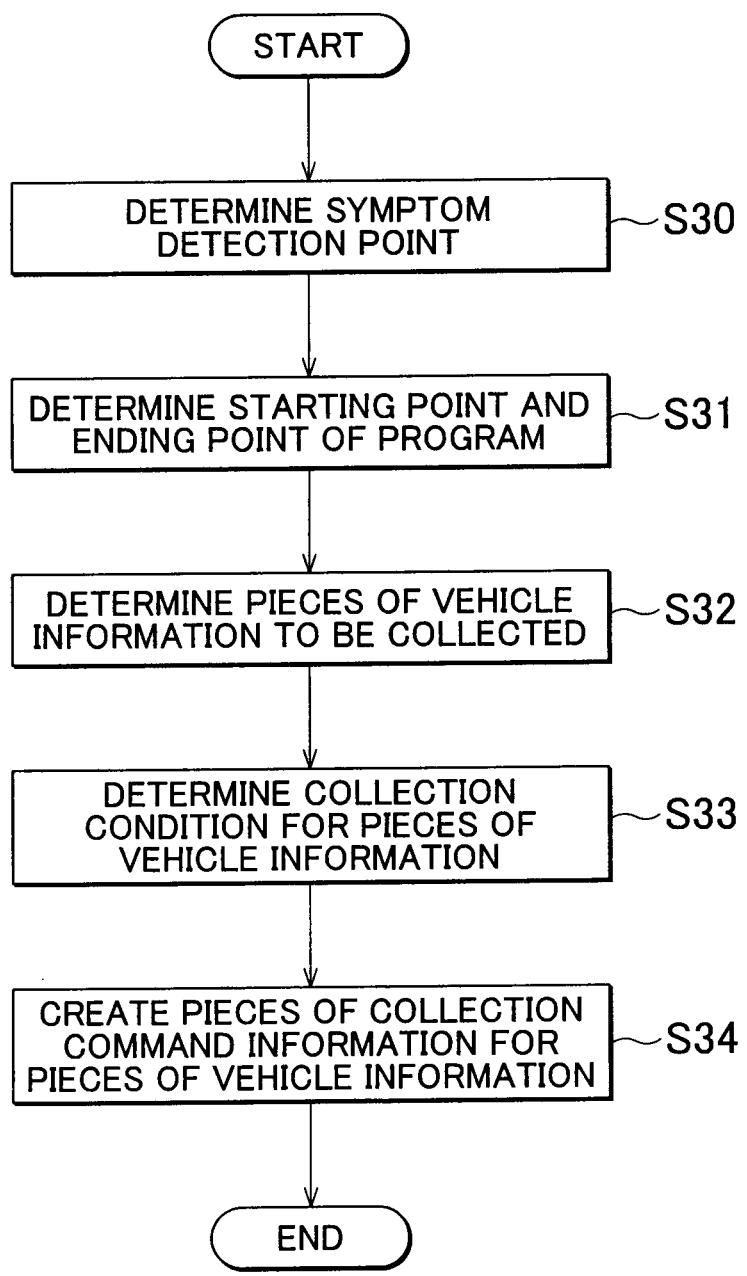
FIG. 6 is a flowchart showing a processing procedure of analyzing the piece of the vehicle information received by the information management center to generate a piece of collection command information in the vehicle information acquisition system.

Subsequently, the procedure of creating pieces of collection command information in the information management center will be described with reference to FIG. 6. In the procedure of creating the pieces of the collection command information, pieces of collection command information for acquiring more detailed pieces of information based on respective acquired pieces of symptom information on various vehicle types are created.

The information management center 2 detects a notable piece of symptom information based on the pieces of the collected information made up of pieces of symptom information that are preserved into the collected information database 203 by the symptom detection portion 24, and determines a probe point (an address) in the execution program 111 where the detected notable piece of the symptom information is acquired (step S30). When the probe point (the address) in the execution program 111 is determined, the collection command information management portion 26 finds sequences that may lead to a probe point in the execution program 111 by the target sequence determination portion 250, and determines a probe point in the execution program 111 that serves as a starting point of those sequences as "an information collection starting point". It should be noted that the sequences and the probe point (the address) in the execution program 111 can be determined by referring to the program structure data 201. Further, the target sequence determination portion 250 determines "the end condition" corresponding to the determined "information collection starting point". As "the end condition", a case where a probe point where the piece of the symptom information is detected has been reached, a case where the procedure in which the sequence reaches, from "the information collection starting point", the probe point where the piece of the symptom information is detected has been exited, the processing time that has elapsed after the processing of "the information collection starting point", and the like are determined (step S31). When the starting point and the end condition are determined, the collection command information management portion 26 determines, by the acquired information determination portion 251, "pieces of vehicle information to be collected" that are useful for detecting a cause of an abnormality from pieces of vehicle information that may be handled by the execution program 111 until the probe point where a symptom is detected by the sequence from "the information collection starting point" is reached, for example, calculated values, pieces of sensor information, and the like (step S32). The pieces of the vehicle information that may be handled by the execution program 111, and the pieces of the vehicle information useful for detecting a cause of an abnormality can be determined by referring to the program structure data 201 and the like. It should be noted that the pieces of the vehicle information that are useful for detecting a cause of an abnormality may also be determined by referring to a database (not shown) in which an abnormality detection pattern is stored, or the like. When "the pieces of the vehicle information to be collected" are determined, the collection command information management portion 26 determines, by the acquired condition determination portion 252, "the travel range for collection" for collecting pieces of vehicle information and "the date and hour for collection" for collecting pieces of vehicle information, from the travel position of the vehicle and the time, at which the piece of the symptom information is detected (step S33). When "the travel range for collection" and "the date and hour for collection" are determined, the collection command information management portion 26 creates, by the collection command information creation portion 253, the collection command information 102 for pieces of vehicle information to be transmitted to the vehicles 1, through the use of, for example, a template (a format) of pieces of collection command information (step S34). Thus, the creation of the pieces of the collection command information is ended.

Figure 7:
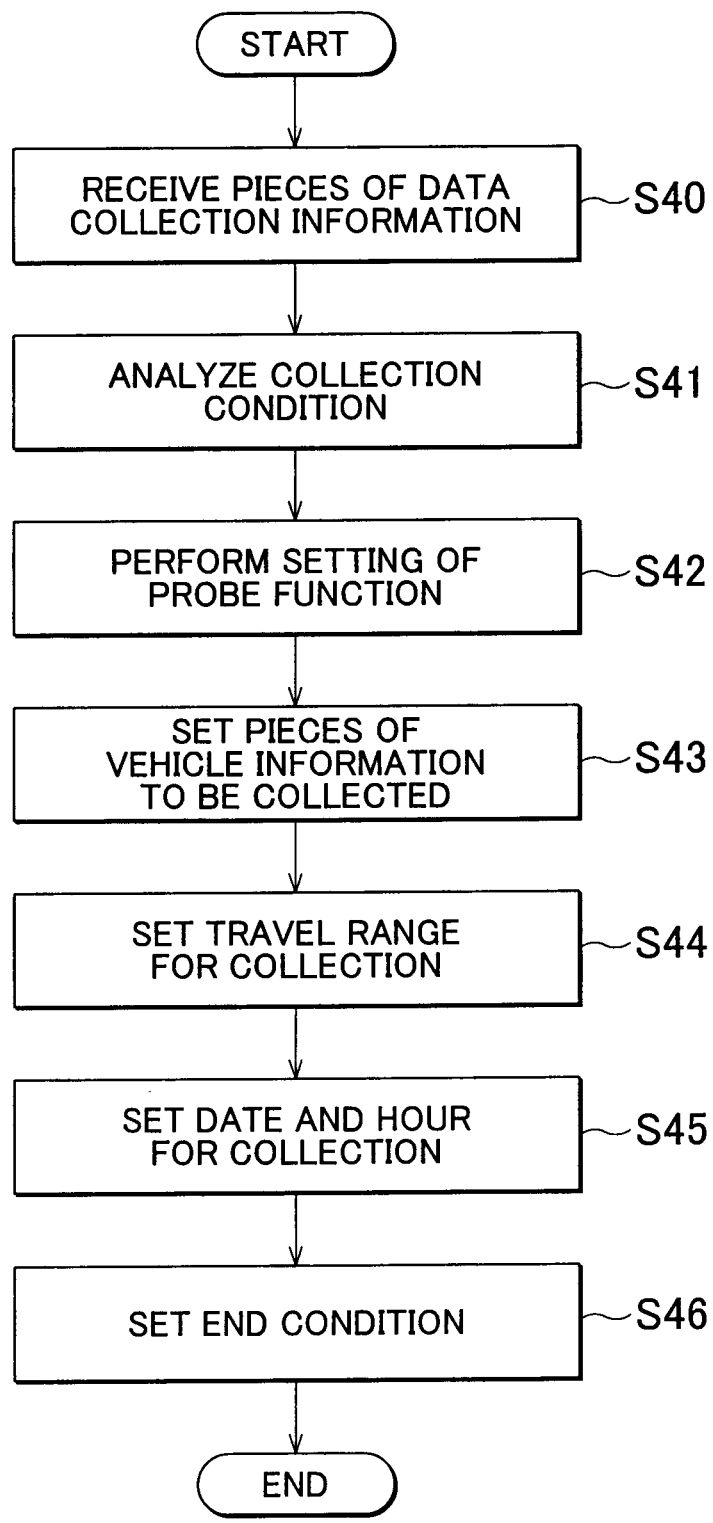
FIG. 7 is a flowchart showing a processing procedure of analyzing the piece of the collection command information received from the information management center by the vehicle to set a collection condition and the like in the vehicle in the vehicle information acquisition system.

In addition, the procedure of setting the pieces of the collection command information, which are received from the information management center, in the vehicles will be described with reference to FIG. 7. The collection command information 102 is distributed from the information management center 2 to each of the vehicles 1 of those vehicle types which are targeted by the collection command information 102. That is, the transmitted/received information management portion 22 of the information management center 2 distributes the collection command information 102 created by the collection command information management portion 26 to each of the vehicles 1 of those vehicle types which are targeted by the collection command information 102, through the center communication portion 21. It should be noted that the single vehicle 1 to which the information is to be distributed will be described hereinafter for the convenience of explanation.

Each of the vehicles 1 of the targeted vehicle type receives the collection command information 102 distributed via the on-vehicle communication portion 11. The transmitted/received information management portion 112 causes the storage portion 100 to preserve the received collection command information 102, notifies the information collection portion 113 that the transmitted/received information management portion 112 has received the collection command information 102, and causes the information collection portion 113 to read the collection command information 102 (step S40). It should be noted that the transmitted/received information management portion 112 may directly impart the received collection command information 102 to the information collection portion 113. Further, collection conditions for a plurality of "information collection starting points" may be separately stored in the collection command information 102. In the following, however, the setting of the collection condition for the single "information collection starting point" will be described. For the convenience of explanation, the description of the setting of the collection conditions for the other "information collection starting points", which are set in a similar manner, will be omitted.

Upon reading the collection command information 102, the information collection portion 113 analyzes the contents of the collection command information 102 in the collection command setting portion 114 (step S41). For example, through an analysis, a command specifying "the first probe point of the function F" as "an information collection starting point", and a command specifying "a probe point address" and "pieces of vehicle speed information" as "pieces of vehicle information to be collected" are obtained. Further, a command specifying "a range within a radius of 1 km from the spot A" as "the travel range for collection", a command specifying "a time zone between 12 o'clock and 14 o'clock on Sundays" as "the date and hour for collection", and a command specifying "the end of the function F" or "the lapse of 500 milliseconds after the start of the processing of the function F" as "the end condition" are obtained. By acquiring pieces of vehicle information based on such commands (the collection condition), the amount of the vehicle information to be collected can be reduced as compared to a case where pieces of vehicle information are collected without being narrowed down. As a result, the processing load of the information processing unit 110 is restrained from increasing, and the collected pieces of the collected information are restrained from causing a shortage of the capacity of the storage portion 100.

When the contents of the collection command information 102 are analyzed, the collection command setting portion 114 of the information collection portion 113 sets enabled the call of probe functions at the subject probe points in the execution program 111 based on "the information collection starting point" (step S42). It should be noted that once a probe function is called at "the information collection starting point", the information collection portion 113 enables the call of all the probe functions set at the probe points in the execution program 111, until "the end condition" is fulfilled.

Further, the collection command setting portion 114 of the information collection portion 113 sets pieces of vehicle information to be collected, from arguments and the like that are passed to the probe functions at the probe points in the execution program 111, based on "the pieces of the vehicle information to be collected" (step S43). More specifically, the probe points and the probe functions are set such that "the pieces of the vehicle information to be collected" are included in the arguments to be passed to the probe functions at the probe points, or "the pieces of the vehicle information to be collected" are set in the collected information preservation portion 117 as pieces of vehicle information to be collected through the probe functions. For example, "probe point addresses" and "pieces of vehicle speed information" are set as "the pieces of the vehicle information to be collected".

In addition, the collection command setting portion 114 of the information collection portion 113 sets "a travel range for collection" in the travel range notification portion 118 (step S44), based on "the travel range for collection". For example, "a range within a radius of 1 km from the spot A" is set as "the travel range for collection". Further, the collection command setting portion 114 of the information collection portion 113 sets "a date and hour for collection" in the timer portion 119 based on "the date and hour for collection" (step S45). For example, as "the date and hour for collection", the start date and hour and the end date and hour are set as "12 o'clock on Sundays" and "14 o'clock on Sundays" respectively. In addition, the collection command setting portion 114 of the information collection portion 113 sets "an end condition" in the collection condition determination portion 115, based on "the end condition" (step S46). For example, although "the end of the function F" is set as "the end condition", "the lapse of 500 milliseconds after the start of the processing of the function F", which is a supplementary end condition, is not set in this case.

Then, the procedure of setting the pieces of the collection command information, which are received from the information management center, in each of the vehicles ends. Finally, the procedure of acquiring pieces of vehicle information in each of the vehicles will be described with reference to FIG. 8. When a probe function of the information collection portion 113 is called at a probe point in the execution program 111 in response to the execution of the execution program 111 (step S50), the information collection portion 113 determines whether or not the called probe function is enabled (step S51). When it is determined that the called probe function is enabled (YES in step S51), the information collection portion 113 determines whether or not the current travel position of each of the vehicles 1 is included in "the travel range for collection" (step S53). When it is determined that the travel position of each of the vehicles 1 is within "the travel range for collection" (YES in step S53), the information collection portion 113 determines whether or not the current time is included in "the date and hour for collection" (step S54).

Subsequently, when it is determined that the current time is included in "the date and hour for collection" (YES in step S54), the information collection portion 113 determines whether or not "the end condition" is set in the collection condition determination portion 115 (step S55). It should be noted that in this embodiment of the invention, the determination on whether or not "the end condition" is set is made considering whether or not a supplementary end condition is set as well. As indicated by the foregoing step S46, in this embodiment of the invention, the condition of ending the collection of pieces of vehicle information through the execution of the called probe function at "the end of the function F" is set. In this case, therefore, it is determined whether or not the supplementary end condition, which is "the lapse of 500 milliseconds after the call of the function F", is set. That is, when it is determined that the supplementary end condition is not set in the collection condition determination portion 115 (NO in step S55), the information collection portion 113 further sets the supplementary end condition as well in the collection condition determination portion 115, based on "the end condition" (step S56), and enables all the probe functions (step S57). This makes it possible to collect pieces of vehicle information through the respective probe functions that are called at the respective probe points in the execution program 111.

Then, in the case where it becomes possible to collect pieces of vehicle information or the case where it is determined that the end condition is set in the collection condition determination portion 115 (YES in step S55), every time a probe function is called, the information collection portion 113 acquires predetermined pieces of vehicle information, and preserves them into the preserved collected information 103 through the collected information preservation portion 117, as pieces of collected information (step S58).

Upon preserving the pieces of the collected information, the information collection portion 113 determines whether or not "the end condition" is fulfilled (step S59). The determination that "the end condition" is fulfilled is made based on the notification, from the timer portion 119, of the call of a probe function at the probe point at "the end of the function F" or "the lapse of 500 milliseconds after the call of a probe function at the beginning of the function F". When it is determined that "the end condition" is not fulfilled (NO in step S59), the information collection portion 113 returns to step S50, and continues to collect pieces of collected information including pieces of vehicle information. On the other hand, when it is determined that "the end condition" is fulfilled (YES in step S59), the information collection portion 113 disables all the probe functions (step S60), and cancels "the end condition" set in the timer portion 119 (step S61). After that, the transmitted/received information management portion 112 transmits pieces of preserved information, which are preserved in the preserved collected information 103, to the information management center 2 (step S62). Thus, the procedure of acquiring pieces of vehicle information in each of the vehicles 1 is ended.

It should be noted that when it is determined after step S50 that the called probe function is not enabled (NO in step S51) or when it is determined that the travel position of each of the vehicles 1 is not within "the travel range for collection" (NO in step S53), the information collection portion 113 determines whether or not pieces of vehicle information are being collected (step S52). Similarly, when it is determined that the current time is not within "the date and hour for collection" (NO in step S54) as well, the information collection portion 113 determines whether or not pieces of vehicle information are being collected (step S52). It is determined that pieces of vehicle information are being collected, when all the probe functions in the information collection portion 113 are enabled. When it is determined that pieces of vehicle information are being collected (YES in step S52), the information collection portion 113 proceeds the processing to the aforementioned step S60 to perform an end processing for ending the collection of pieces of vehicle information. On the other hand, when it is determined that pieces of vehicle information are not being collected (NO in step S52), the information collection portion 113 returns to step S50 to repeat the processing at and after step S50.

Besides, from then on, the procedure of preserving the pieces of the collected information received from each of the vehicles into the information management center (steps S20 and S21), and the procedure of creating pieces of collection command information in the information management center (steps S30 to S34) are carried out. Subsequently, through the performance of the procedure of setting pieces of collection command information, which are received from the information management center, in each of the vehicles (steps S40 to S46), and the procedure of acquiring pieces of vehicle information in each of the vehicles (steps S50 to S62), pieces of information that are needed as pieces of vehicle information, such as pieces of vehicle information on a cause of a targeted piece of symptom information and the like, can be narrowed down and collected. That is, in the case where the cause determination portion 25 cannot determine a cause based on pieces of collected information, which are collected based on the collection command information 102 sent from the information management center 2, the collection condition is further adjusted, for example, limited so that the cause can be determined. The collection command information management portion 26 is thus caused to create new collection command information 102. Then, this newly created collection command information 102 is transferred to each of the vehicles 1, and the information collection portion 113 of each of the vehicles 1 is caused to read the contents of this newly created collection command information 102, so that pieces of vehicle information, collection conditions, and the like are re-set. Thus, in each of the vehicles 1, pieces of collected information including pieces of vehicle information are collected based on the newly created collection command information 102. The information management center 2 that has received these collected pieces of the collected information can determine a cause by the cause determination portion 25, based on the pieces of the collected information that are collected based on the new collection command information 102.

Further, it is also possible to set the collection condition based on the pieces of the vehicle information acquired from the plurality of the vehicles 1, by referring to the pieces of the collected information stored in the collected information database 203. In this case, the cause determination portion 25 or the like can determine whether or not a change in vehicle information that has occurred in a certain one of the vehicles 1 will occur in another vehicle 1 as well.

In addition, as shown in FIG. 1, when the collection command information 102 is set in the plurality of the vehicles 1, the information management center 2 can acquire pieces of vehicle information from the plurality of the vehicles 1 that are each equipped with the information collection portion 113. Further, the collection command information 102 can be set also in vehicles, from which the pieces of the collected information have not been acquired. Thus, the information management center 2 can also determine, by the cause determination portion 25 or the like, which of the change that depends on a certain one of the vehicles, the change that depends on a certain vehicle type, and the change occurs in vehicles in general, a change that has occurred in the pieces of the vehicle information on the plurality of the vehicles 1 is.

Using a result of an analysis of the collected pieces of the vehicle information, pieces of vehicle information to be collected by each of the vehicles 1 can be determined. Thus, based on the collected pieces of vehicle information, pieces of vehicle information to be collected subsequently can be so set that pieces of information that are more suited to a purpose are acquired. For example, in the case where an abnormality is detected from pieces of vehicle information, the collection condition can be so set as to narrow down a cause of the abnormality or the like.

Further, by prescribing the collection condition for an arbitrary piece of vehicle information that is handled (processed) by the execution program 111 of the information processing unit 110, it also becomes possible to set not only a vehicle state obtained based on an on-vehicle sensor but also pieces of information processed by a program or the like, as the pieces of the vehicle information acquired from the information processing unit 110. Thus, the pieces of the information that are handled by the execution program 111, which is executed by the information processing unit 110, or the like, can also be set as the target pieces of vehicle information. Therefore, a detailed determination on a cause of a symptom of an abnormality that has occurred in a vehicle 1, for example, can be made from a large number of pieces of information, and the symptom of the abnormality can be detected as well.

In addition, pieces of vehicle information are collected according to a collection condition that is so set as to narrow down a cause, so that the amount of the vehicle information that is collected at a time can be reduced. Thus, the information processing unit 110 of that one of the vehicles 1 that has low information processing capacity can collect pieces of vehicle information while maintaining its normal function. Thus, the collection of pieces of vehicle information is facilitated.

For example, when there is no need to set a collection condition, a collection condition with a default value, which is determined in advance, is used to make it possible to carry out the monitoring of pieces of vehicle information that are suited to the monitoring of a general state of each of the vehicles 1, for example, the exhaustive monitoring of a state, the monitoring of pieces of information with high level of importance, or the like. Thus, it is possible to spare the burden of setting the collection condition.

By setting, as the collection condition, a condition on a symptom of an abnormality, a cause of a symptom of an abnormality occurring in the vehicle(s) 1 can be swiftly determined as well. Further, the information management center 2 analyzes an abnormality in each of the vehicles 1, so that the abnormality in each of the vehicles 1 can be analyzed in more detail as well in comparison with a determination made by the information processing unit 110. Further, by further acquiring pieces of vehicle information based on a collection condition that is determined based on a result of an analysis, it also becomes possible to narrow down the cause of the abnormality stepwise.

Each of the vehicles 1 has the property that differs depending on the vehicle type. Therefore, by accumulating pieces of vehicle information on the vehicles of the same type, it also becomes possible to detect the characteristics of the vehicles of the same type, especially an abnormality specific to the vehicle type.

The traffic situation differs depending on the time zone as well as the travel position (e.g., straight roads, roads with intersections, curved roads, etc. shown in FIG. 1). In some cases, therefore, the pieces of the vehicle information characteristically change depending on the travel position and the time. Thus, by analyzing the position and the time together, it becomes possible to re-set the collection condition so that a more detailed analysis, for example, the determination of a situation of the occurrence of an abnormality can be suitably carried out.

The traffic situation differs depending on the time zone as well as the travel position. In some cases, therefore, the pieces of the vehicle information characteristically change depending on the travel position and the time. Thus, by determining a travel position and a time for the collection condition to be re-set, it becomes possible to suitably carry out a more detailed analysis, for example, the determination of a situation, in which an abnormality occurred, based on the acquired pieces of the vehicle information. Further, since the travel position and the time are determined, the amount of the vehicle information to be acquired can be reduced as well.

By setting the collection condition based on the pieces of the vehicle information acquired from the plurality of the vehicles 1, it becomes possible to determine whether or not a change in vehicle information that has occurred in a certain one of the vehicles 1 also occurs in another vehicle 1. Thus, a determination for narrowing down the cause of a change occurring in the pieces of the vehicle information, for example, the cause of an abnormality or the like can be suitably made as well.

The collection condition is set in the plurality of the vehicles 1, so that pieces of vehicle information are acquired from the plurality of the vehicles 1 that are each equipped with the information collection portion. Thus, it becomes possible to determine, for example, which of the change that depends on a certain one of the vehicles 1, the change that depends on a certain vehicle type, and the change that occurs in all vehicles in general, a change occurring in the pieces of the vehicle information on the plurality of the vehicles 1 is. Thus, a determination for narrowing down the cause of the change occurring in the pieces of the vehicle information, for example, the cause of an abnormality or the like can be suitably made as well.

It should be noted that the foregoing embodiment of the invention can also be carried out in the following modes. Although the case where the pieces of the vehicle type information are included in the pieces of the collected information has been exemplified in the foregoing embodiment of the invention, the invention is not limited thereto. The information management center may identify vehicle types from other pieces of information. That is, the identification of vehicles may be carried out based on vehicle IDs, which are included in pieces of collected information, or the like, or based on communication IDs, which are used at the time of communication, or the like. In this case, the information management center may acquire pieces of information specific to the vehicles by referring to a list that makes it possible to search for the pieces of the information specific to the vehicle by the vehicle ID or the communication ID. Thus, the degree of freedom in designing the vehicle information acquisition system can be increased.

Although the case where the pieces of the symptom information are detected based on the collection command information 102 has been exemplified in the foregoing embodiment of the invention, the invention is not limited thereto. Pieces of diagnostic information detected by a self-diagnosis unit, or pieces of failure history information, which are pieces of information at the stage previous to the pieces of the diagnostic information, may be used as pieces of symptom information. In particular, by using the pieces of the information from the self-diagnosis unit instead of the pieces of the symptom information that are based on the pieces of the collection command information resulting from default values, it also becomes possible to hold the processing load of the information processing unit low. Further, when pieces of vehicle information on a symptom of an abnormality are acquired through the use of a failure diagnosis unit that is generally provided in a vehicle, it is also possible to omit the setting of a collection condition prior to the narrowing-down of a cause (e.g., the setting of default values).

Although the case where the probe point where the function F of the execution program 111 (the program 101) is started is determined based on the information collection starting point and setting is performed so that the probe function of the information collection portion 113 is called at this determined probe point has been exemplified in the foregoing embodiment of the invention, the invention is not limited thereto. Instead of using the probe point to call the probe function, a well-known method that makes it possible to intervene in the processing of the program may be utilized. For example, it is also appropriate to allow the program to intervene in the normal processing of calling a function, utilize the interrupt function of the operation system, or rewrite or replace some of the commands of the program. In this way, the degree of freedom of points where pieces of vehicle information can be acquired is increased, so that it becomes possible to acquire pieces of information suited to the determination of a cause, and also to carry out the determination of the cause more swiftly.

Although the case where the pieces of the vehicle information are acquired from the execution program 111 (the program 101) has been exemplified in the foregoing embodiment of the invention, the invention is not limited thereto. Pieces of vehicle information may also be acquired from other programs that are executed by the information processing unit. In this case, by causing the information management center to retain structure data of other programs and the like, it becomes possible to create pieces of collection command information for collecting pieces of vehicle information from those programs, and cause each of the vehicles to acquire pieces of vehicle information handled by those programs based on the created pieces of the collection command information. In this way, the range of application of the vehicle information acquisition system is enlarged.

Although the case where the piece of the symptom information is mainly the piece of information on the abnormality has been described in the foregoing embodiment of the invention, the invention is not limited thereto. A piece of vehicle information that is handled as the pieces of the symptom information is not limited to that which concerns an abnormality. That is, any value can be handled as a piece of symptom information as long as this value relates to a piece of vehicle information that is desired to be acquired by the information management center. For example, with a view to confirming that the program is in normal operation, it is also appropriate to handle a normal value as a piece of symptom information, and create a piece of collection command information based on the piece of the symptom information. In this way, the level of convenience of the vehicle information acquisition system is enhanced.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

The invention claimed is:

1. A vehicle information acquisition system comprising:
a vehicle;
an information processing unit that is mounted on the vehicle, and is configured to process a piece of vehicle information as a piece of information indicating a vehicle state; and
an information management center that is configured to be able to communicate with the vehicle and acquire the piece of the vehicle information, wherein
the vehicle includes an information acquisition portion that is configured to acquire the piece of the vehicle information to be processed by the information processing unit based on a set collection condition that enables acquisition of a piece of vehicle information indicating a symptom of an abnormality, and transmit the acquired piece of the vehicle information to the information management center,
the information management center is configured to determine a new collection condition for the piece of the vehicle information to be processed by the information processing unit based on a result of an analysis of the transmitted piece of the vehicle information, and transmit the new collection condition to the vehicle to re-set the set collection condition in the information acquisition portion so that the set collection condition is equivalent to the new collection condition, and
the information acquisition portion acquires a second piece of vehicle information based on the set collection condition after being reset and transmits the second piece of the vehicle information to the information management center.

2. The vehicle information acquisition system according to claim 1, wherein the information acquisition portion is configured to acquire a relevant piece of vehicle information based on an initially set collection condition, when no collection condition is set by the information management center.

3. The vehicle information acquisition system according to claim 1, wherein the information management center is configured to analyze the abnormality in the vehicle from the transmitted piece of the vehicle information, and determine the new collection condition to be re-set in the information acquisition portion, based on a content of the abnormality in the vehicle that is a result of the analysis.

4. The vehicle information acquisition system according to claim 1, wherein the information management center is configured to identify a vehicle type of the vehicle that has transmitted the piece of the vehicle information, and accumulate results of an analysis for each identified vehicle type individually.

5. The vehicle information acquisition system according to claim 1, wherein a piece of position information and a piece of time information are added to the piece of the vehicle information, and
the information management center is configured to determine the new collection condition to be re-set in the information acquisition portion, based on a result of an analysis of the piece of the vehicle information, which is obtained by analyzing the piece of the position information and the piece of the time information together.

6. The vehicle information acquisition system according to claim 1, wherein the new collection condition to be re-set includes at least one of a piece of position information and a piece of time information.

7. The vehicle information acquisition system according to claim 1, wherein the information management center is configured to determine the new collection condition to be re-set based on a result of an analysis of pieces of vehicle information that are acquired from a plurality of the vehicles.

8. The vehicle information acquisition system according to claim 1, wherein the information management center is configured to re-set the new collection condition to be re-set also in an information acquisition portion of another vehicle that is different from the vehicle that has transmitted the piece of the vehicle information.

9. A vehicle information acquisition method of causing an information management center, which is configured to be able to communicate with a vehicle, to acquire a piece of vehicle information that is processed by an information processing unit mounted on the vehicle as a piece of information indicating a vehicle state, comprising
repeating, until a piece of information that is needed as a piece of vehicle information is obtained:
acquiring a piece of vehicle information, which is processed by the information processing unit, based on a set collection condition the enables acquisition of a piece of vehicle information indicating a symptom of an abnormality through an information acquisition portion provided in the vehicle, and transmitting the acquired piece of the vehicle information to the information management center; and,
in the information management center, determining a new collection condition for the piece of the vehicle information to be processed by the information processing unit, based on a result of an analysis of the transmitted piece of the vehicle information, and transmitting the new collection condition to the vehicle to re-set the set collection condition in the information acquisition portion so that the set collection condition is equivalent to the new collection condition, and
the information acquisition portion acquires a second piece of vehicle information based on the set collection condition after being reset and transmits the second piece of the vehicle information to the information management center.

10. The vehicle information acquisition method according to claim 9, wherein the information acquisition portion is caused to acquire a relevant piece of vehicle information based on an initially set collection condition, when no collection condition is set by the information management center.

11. The vehicle information acquisition method according to claim 9, wherein, by the information management center, the abnormality in the vehicle is analyzed from the transmitted piece of the vehicle information and the new collection condition to be re-set in the information acquisition portion is determined based on a content of the abnormality in the vehicle that is a result of the analysis.

12. The vehicle information acquisition method according to claim 9, wherein, by the information management center, a vehicle type of the vehicle that has transmitted the piece of the vehicle information is identified and results of an analysis are accumulated for each identified vehicle type individually.

13. The vehicle information acquisition method according to claim 9, wherein a piece of position information and a piece of time information are added to the piece of the vehicle information, and, by the information management center, the new collection condition to be re-set in the information acquisition portion is determined based on a result of an analysis of the piece of the vehicle information, which is obtained by analyzing the piece of the position information and the piece of the time information together.

14. The vehicle information acquisition method according to claim 9, wherein at least one of a piece of position information and a piece of time information is included in the new collection condition to be re-set.

15. The vehicle information acquisition method according to claim 9, wherein, by the information management center, the new collection condition to be re-set is determined based on a result of an analysis of pieces of vehicle information that are acquired from a plurality of vehicles.

16. The vehicle information acquisition method according to claim 9, wherein, by the information management center, the new collection condition to be re-set is re-set also in an information acquisition portion of another vehicle that is different from the vehicle that has transmitted the piece of the vehicle information.

\* \* \* \* \*